United States Patent [19]

Hamura et al.

[11] Patent Number: 5,668,930
[45] Date of Patent: Sep. 16, 1997

[54] OFF-LINE TEACHING METHOD FOR A ROBOT

[75] Inventors: Masayuki Hamura; Kenji Aztuma; Shinsuke Sakamoto, all of Oshino-mura, Japan

[73] Assignee: Fanuc Ltd, Yamanashi, Japan

[21] Appl. No.: 381,815

[22] PCT Filed: Jun. 6, 1994

[86] PCT No.: PCT/JP94/00910

§ 371 Date: Feb. 6, 1995

§ 102(e) Date: Feb. 6, 1995

[87] PCT Pub. No.: WO94/29775

PCT Pub. Date: Dec. 22, 1994

[30] Foreign Application Priority Data

Jun. 7, 1993 [JP] Japan ............................ 5-163239

[51] Int. Cl.⁶ ............................................. G05B 19/04
[52] U.S. Cl. .................... 395/87; 395/86; 395/97; 901/2
[58] Field of Search ............................. 395/80, 85, 86, 395/87, 88, 94, 97; 318/573, 568.13, 568.11; 364/474.28, 474.31, 474.35; 901/3, 4, 5

[56] References Cited

U.S. PATENT DOCUMENTS

| | | | |
|---|---|---|---|
| 4,967,125 | 10/1990 | Hara | 318/568.11 |
| 5,053,976 | 10/1991 | Nose et al. | 395/86 |
| 5,327,057 | 7/1994 | Kishi et al. | 318/568.11 |
| 5,416,716 | 5/1995 | Zeman et al. | 364/474.29 |

FOREIGN PATENT DOCUMENTS

| | | | |
|---|---|---|---|
| 59-208605 | 11/1984 | Japan | G05B 19/42 |
| 62-285110 | 12/1987 | Japan | G05B 19/403 |
| 3-52003 | 3/1991 | Japan | G05B 19/403 |

*Primary Examiner*—Tariq R. Hafiz
*Attorney, Agent, or Firm*—Staas & Halsey

[57] ABSTRACT

An off-line data teaching method for a robot in which a desired posture of the robot is maintained in passing the bending portion of the operation line by preparing off-line teaching data for an operation line on a workpiece which is subjected to an operation of a robot, and by performing an insertion of a circular arc. The indicators (A, L and C) representing air-cut points, terminal point of a linear segment, and intermediate and terminal points of a circular arc segment are assigned to each coordinate data of the operation line consisting of linear segments and circular arc segments on a plane. The circular arc $J(1)i+1$ of small radius is inserted by defining the new teaching points $L(1)i+1$, $C''(1)i+1$ and $C'(1)i+1$ and disqualify the bending point $Li+1$. The coordinate data after insertion of the circular arc and the indicators are used to determine the position and posture of the robot.

8 Claims, 14 Drawing Sheets

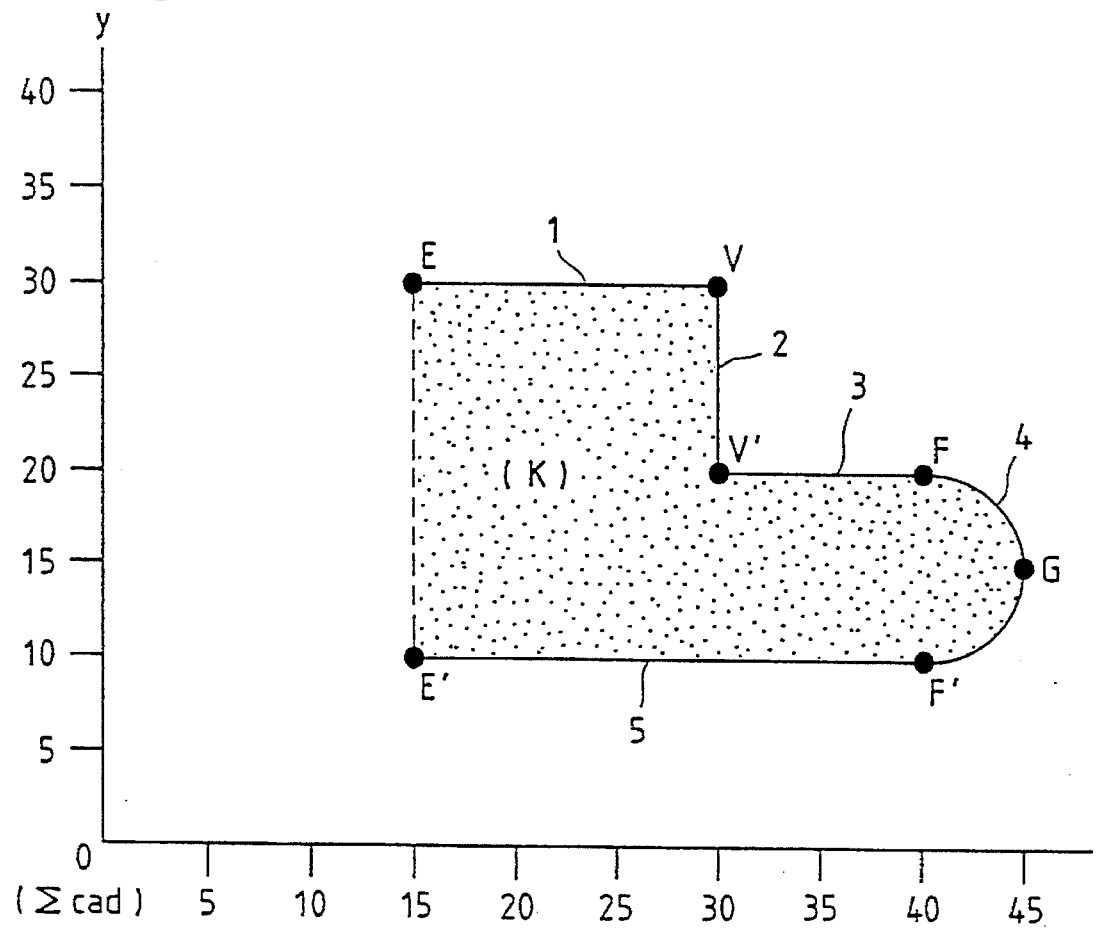

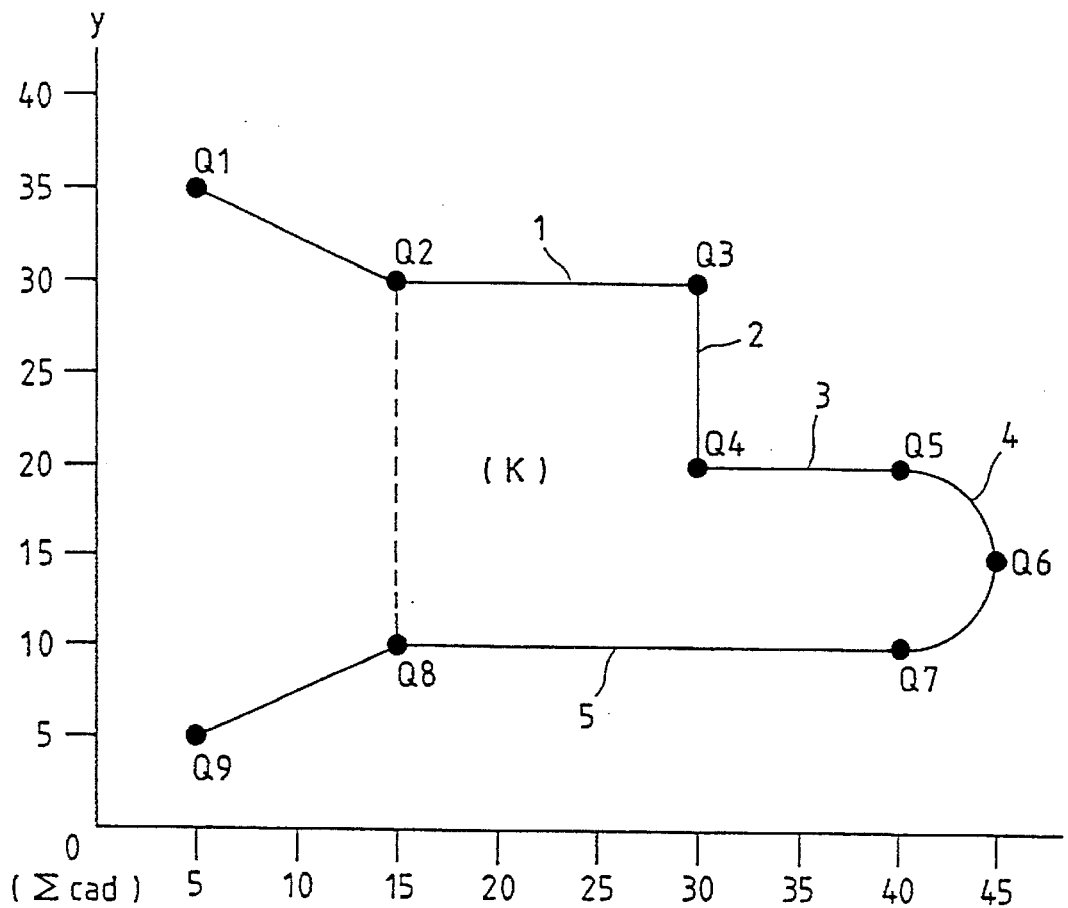

| COORDINATE DATA | |
|---|---|
| PROVISIONAL TEACHING POINTS | x,y DATA |
| A 1 | ( 5, 35) |
| L 2 | (15, 30) |
| L 3 | (30, 30) |
| L 4 | (30, 20) |
| L 5 | (40, 20) |
| C 6 | (45, 15) |
| C 7 | (40, 10) |
| L 8 | (15, 10) |
| A 9 | ( 5,  5) |

| TEACHING POSITIONS AND POSTURE DATA | | | | | | | |
|---|---|---|---|---|---|---|---|
| TEACHING POINTS | X, | Y, | Z; | W, | P, | R | DATA |
| A 1 | ( 5, | 35, | 0; | 0, | 0, | -90 | ) |
| L 2 | ( 15, | 30, | 0; | 0, | 0, | -90 | ) |
| L 3 | ( 29, | 30, | 0; | 0, | 0, | -90 | ) |
| C 4 | ( 29.71, | 29.71, | 0; | 0, | 0, | -135 | ) |
| C 5 | ( 30, | 29, | 0; | 0, | 0, | 180 | ) |
| L 6 | ( 30, | 21, | 0; | 0, | 0, | 180 | ) |
| C 7 | ( 30.29, | 20.29, | 0; | 0, | 0, | -135 | ) |
| C 8 | ( 31, | 20, | 0; | 0, | 0, | 90 | ) |
| L 9 | ( 40, | 20, | 0; | 0, | 0, | 90 | ) |
| C 10 | ( 45, | 15, | 0; | 0, | 0, | 180 | ) |
| C 11 | ( 40, | 10, | 0; | 0, | 0, | 90 | ) |
| L 12 | ( 15, | 10, | 0; | 0, | 0, | 90 | ) |
| A 13 | ( 5, | 5, | 0; | 0, | 0, | 90 | ) |

OFF-LINE TEACHING METHOD FOR A ROBOT

FIELD OF THE INVENTION

The present invention relates to an off-line teaching method for an industrial robot which operates according to a given teaching program, and more particularly to an off-line teaching method in which a desired posture of the robot is maintained even if any bent portion (a junction between two adjacent straight line segments or a corner portion) is included in an operation line on an object of an operation such as deburring.

DESCRIPTION OF THE RELATED ART

In performing an off-line teaching of a robot for effecting an operation such as deburring, it is common, using a personal computer or a work station, to repeatedly execute the steps of: displaying the layout of a robot and an object of operation (workpiece) on a display screen; setting necessary plural number of teaching points necessary for the robot to take the positions and postures suited for the operation, teaching a robot position (the position of distal end of its tool) when the distal end of the tool is placed to coincide with each teaching point on the display screen, and determining an optimum posture of the robot (posture of the tool) for each teaching point.

There is another applicable teaching method which comprises: outputting CAD data of the object of operation as X-Y coordinate data; determining necessary values for defining the posture of the robot after reviewing the outputted data; and manually inputting the determined values through the teaching operation panel (teaching pendant).

However, the above conventional teaching methods require a number of steps such as bringing the tool tip to coincide with the predetermined teaching points on the display screen and setting the robot posture, determining values for defining the robot posture, and manually inputting the teaching data, thereby suffering a problem that the teaching operation is not of satisfactory efficiency.

It is not unusual that the teaching points amount to several hundreds in a teaching operation for deburring, and the necessary programs tends to increase as the demand for the diversified small-lot production increases. Thus, as long as the conventional teaching method is employed, it is inevitable that the time and labor necessary for overall teaching operation increases to reduce the merit of the robot as a laborsaving means.

In determining the robot posture at each of the teaching points including air-cut points, it is necessary to provide a scheme for preventing the robot from being overloaded due to an abrupt change of the robot posture during movement. In the conventional teaching methods, however, there is a possibility of teaching inappropriate posture to the robot due to the lack of such a scheme.

An off-line teaching method for overcoming the above problems in the conventional methods has been proposed in Japanese Patent Application No. 5-59463 (1993). This off-line teaching method is applicable in a case where an operation line on the object of operation consists of the combination of straight-lines and circular-arcs, and the information containing the coordinate data which represent the operation line defined by connecting any number of straight-line elements and circular-arc elements on a plane is prepared in a form available for the data processing means (e.g. CAD data). The off-line teaching is executed with the data processing means by identifying the type of path environment at each junction (identifications of an end point of straight line segment, an intermediate or end point of circular-arc, etc.); defining necessary air-cut points; assigning the information relating to the type of path environment and trajectory of robot to each junction and air-cut point, and determining the position and posture of the robot based on the assigned information and the conditions selected in consideration of relative position of the operation line to the robot trajectory (ex. whether the operation line is on the left or right of the robot trajectory).

Also, another off-line teaching method is proposed in Japanese Patent Application No. 5-89511 (1993) in which the above method is modified so as to be applicable to the cases where operation lines exist on plural planes. According to this method, a sub program is provided for performing the above method on each of the planes. These sub programs can be combined in any selected order corresponding to the sequence of operation, thus enabling a master program to be prepared in off-line teaching.

Each of the foregoing two off-line teaching methods is designed to provide a substantial solution to the problem of the prior art. However, these inventions still have a problem that a bent junction included in a linear portion of the operation line adversely affect the teaching of robot posture. Particularly, when the off-line teaching of the robot is executed on condition that the relative posture of the robot or the tool carried by the robot is kept constant with respect to the operation line in deburring operation, at the bent junction of linear segments, the robot posture is taught with reference to an extension line of the linear segment lying immediately before the point at which the linear segment is bent, so that, generally, the posture of the robot after passing the point of bend of the linear segment will not coincide with the desired posture.

This nonconforming condition will gradually be improved through the playback operation based on the ordinary interpolation processing as the robot advances towards the next teaching point (or the terminal point of the operation line). Nevertheless, in this case, it is inevitable that the robot will take undesired posture over a considerable span of the operation line after passing the point at which the linear segment is bent. The larger the angle of the bend between the linear segments, the more the robot posture will be departed from its ideal state.

As a direct solution to this, it can be considered to teach the robot to steeply change its posture as much as the angle of the bend at the junction of the linear segments, this, however, will cause overloading of the robot, so that this solution cannot be considered a practical one. Also, it can be considered to stop the movement of the robot once so that the posture of the robot is allowed to be gradually changed, and resume the movement; however, this method inevitable entails the fall of operating efficiency resulting from the stop of the robot.

SUMMARY OF THE PRESENT INVENTION

It is an object of the present invention to solve problems relating to the bent portion in an operation line when the original off-line teaching data are prepared based on the operation line data in a form such as CAD data.

More specifically, in a case where at least a part of the operation line is formed by connecting two or more linear segments and any number (including 0) of circular arc segments on a plane and having at least one bent junction of linear segments, an object of the present invention is to maintain the posture of the robot in the substantially ideal state throughout its movement in the linear segments section before and after the bent junction and also to allow the robot to pass the bend junction smoothly without being overloaded. For achieving the objects, a process of inserting a small-radius circular arc is automatically executed with respect to the data relating to the bent junction of linear segments in the original teaching data which are prepared in a form capable of being processed with a data processing means such as a CAD system or a personal computer.

An off-line teaching method for a robot according to the present invention comprises the steps of: preparing, in a form capable of being processed by an information processing means, the coordinate data representing the original teaching points for defining an operation line along which said robot is to be moved, said original teaching points including at least one bent junction at which two linear segments intersects with each other; defining a first point on one of said two linear segments, a second point on the other linear segment and a third point in the vicinity of said bent junction in order to define a circular arc of a small radius, which continuously joins the two linear segments intersecting at said bent junction, using the data relating to said bent junction in said coordinate data representing said original teaching points, said third point being situated on said small-radius circular arc which tangentially joins said two linear segments at said first and second points; and teaching the robot a position and a posture at said first, second and third points in place of said bent junction.

The first, second and third points are defined by using the data for specifying the sequence of the movement of the robot and the data for specifying the type of path form, assigned to each original teaching points.

Further, coordinate data representing air-cut points linked to the start and terminal points of the operation line are prepared in addition to the coordinate data representing the original teaching points. A data for specifying of a sequence of the robot movement and a data for specifying a type of path form are assigned to each air-cut point. Those data are used in determining the position and posture of the robot.

The method of the present invention is applicable even when a part of the operation line extends on a plurality of planes. For example, it is applicable to a case where the operation line is distributed among the different planes of a workpiece.

BRIEF DESCRIPTION OF DRAWINGS

FIG. 2a is a schematic diagram showing an operation line and its representative points on a CAD screen, and FIG. 2b shows coordinate data of the representative points;

FIG. 3a is a schematic diagram showing the traveling path on the CAD screen with air-cut points added to start and terminal points of the operation line as shown in FIGS. 2a–2b and FIG. 3b shows coordinate data of the representative points and air-cut points;

FIG. 4a is a schematic diagram showing the representative points and air-cut points with indicators on the traveling path as shown in FIG. 3a, and FIG. 4b shows coordinate data corresponding to FIG. 4a;

FIGS. 8a and 8b are schematic diagrams respectively showing an operation line modified with the circular-arc segments inserted and a coordinate data corresponding to FIG. 8a;

DESCRIPTION OF THE PREFERRED EMBODIMENTS

Referring to FIGS. 1a–1d, a process for inserting a circular-arc segment of small diameter between two adjoining linear segments, and a process for creating the teaching data for determining the three points (start, intermediate and terminal points) for defining the circular-arc segment will be described.

Figure 1A:
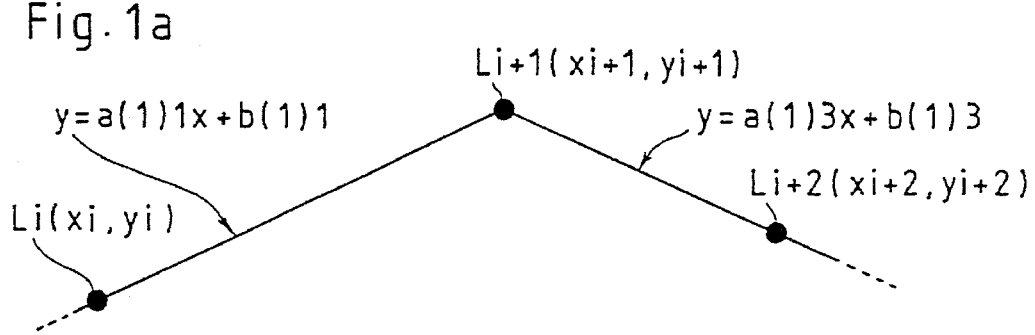
FIGS. 1a–1d are schematic diagrams showing a procedure of inserting a circular-arc of a small radius in the bent junction of linear segments and for creating a teaching data of the three points (start point, intermediate point and terminal point) for defining the circular-arc.

FIG. 1a shows the original data relating to a bent junction point of linear segments included in the operation line. In the original data, position data for the points Li, Li+1 and Li+2 are given as i-th, i+1-th and i+2-th teaching points, respectively. Those teaching points at this stage will hereinafter be referred to "provisional teaching points" for convenience.

As mentioned previously, if these provisional teaching points are directly registered as actual teaching points, it is difficult for the robot to smoothly change its posture as it passes a bent junction at which two linear segments intersect with each other and determine its posture properly on the path along the linear segments Li+1 to Li+2. Thus, it is considered to replace the linear segment including the bent junction with a circular-arc. For this purpose, the following calculation processes Cal. 1 to Cal. 9 are executed.

[CAL. 1]

An equation to represent a straight line Li Li+1 is obtained. Assuming that the points Li and Li+1 are represented by two coordinate values (xi,yi) and (xi+1,yi+1) respectively, the following relationship is established: when xi≠xi+1, $$y=a(1)_1 x+b(1)_1 \quad (1)$$

$$a(1)_1=(yi+1-yi)/(xi+1-xi) \quad (2)$$

$$b(1)_1=(yi \cdot xi+1-yi+1 \cdot xi)/(xi+1-xi), \quad (3)$$

and when xi=xi+1, $$x=xi=xi+1. \quad (4)$$

FIGS. 1a–1d illustrate the cases where xi≠xi+1 and xi+1≠xi+2.

[CAL. 2]

Figure 1B:
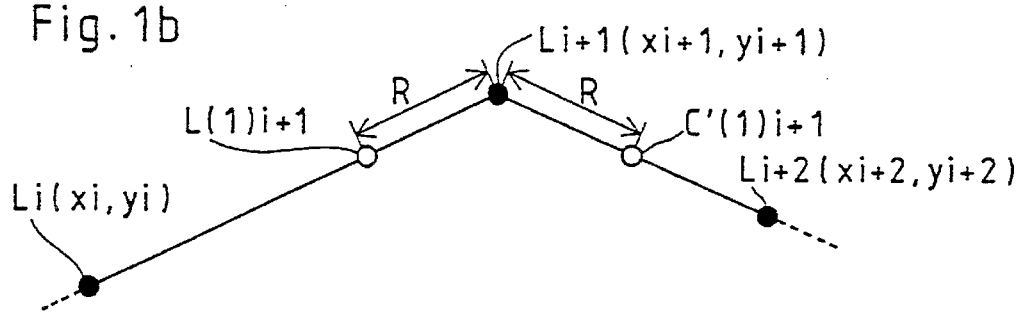

As shown in FIG. 1b, a point L(1)i+1 at a distance of R (R being a positive constant) from the provisional teaching point Li+1 on the straight line Li Li+1 is determined.

Where the coordinate value of the point L(1)i+1 is represented by (x(1)i+1,y(1)i+1),
when xi<xi+1, $$\begin{bmatrix} x(1)i+1 = xi+1 - S(1)1 \\ y(1)i+1 = yi+1 - a(1)1 \cdot S(1)1 \end{bmatrix} \quad (5)$$

and when xi>xi+1, $$\begin{bmatrix} x(1)i+1 = xi+1 + S(1)1 \\ y(1)i+1 = yi+1 + a(1)1 \cdot S(1)1 \end{bmatrix} \quad (6)$$

In any case, however, $$S(1)1 = R/[\{a(1)1\}^2 + 1]^{1/2}. \quad (7)$$

when xi=xi+1 and yi<yi+1, $$\begin{bmatrix} x(1)i+1 = xi+1 \\ y(1)i+1 = yi+1 - R \end{bmatrix} \quad (8)$$

and when xi=xi+1 and yi>yi+1, $$\begin{bmatrix} x(1)i+1 = xi+1 \\ y(1)i+1 = yi+1 + R \end{bmatrix} \quad (9)$$

Calculating according to the above-described rule, the coordinate value of the point L(1)i+1 is determined. Then, an equation representing the straight line extending from Li+1 to Li+2 is obtained by Cal. 3 and Cal. 4 in the same manner as of Cal. 1 and Cal. 2. Also, the position of a point C(1)i+3 at a distance of R from the provisional teaching point Li+1 on the straight line between Li+1 and Li+2 is determined as shown in FIG. 1b.

[CAL. 3]

The equation to represent the straight line Li+1 L1+2 is obtained. Where the point Li+2 is represented by a coordinate value (xi+2,yi+2), and xi+1≠xi+2, the equation is given as $$y = a(1)3x + b(1)3 \quad (10)$$

$$a(1)3 = (yi+2 - yi+1)/(xi+2 - xi+1) \quad (11)$$

$$b(1)3 = (yi+1 \cdot xi+2 - yi+2 \cdot xi+1)/(xi+2 - xi+1) \quad (12)$$

And, when xi+1=xi+2, $$x = xi+1 = xi+2 \quad (13)$$

[CAL. 4]

The position of point C'(1)i+1 represented by (x'(1)i+1, y'(1)i+1) can be expressed as follows:
When xi+1<xi+2, $$\begin{bmatrix} x'(1)i+1 = xi+1 + S(1)2 \\ y'(1)i+1 = yi+1 + a(1)3 \cdot S(1)2 \end{bmatrix} \quad (14)$$

and when xi+1>xi+2, $$\begin{bmatrix} x'(1)i+1 = xi+1 - S(1)1 \\ y'(1)i+3 = yi+1 - a(1)3 \cdot S(1)2 \end{bmatrix} \quad (15)$$

In either case, however, $$S(1)2 = R/[\{a(1)3\}^2 + 1]^{1/2} \quad (16)$$

Also, when xi+1=xi+2 and yi+1>yi+2, $$\begin{bmatrix} x'(1)i+3 = xi+1 \\ y'(1)i+1 = yi+1 - R \end{bmatrix} \quad (17)$$

and when xi+1=xi+2 and yi+1<yi+2, $$\begin{bmatrix} x'(1)i+1 = xi+1 \\ y'(1)i+1 = yi+1 + R \end{bmatrix} \quad (18)$$

[CAL. 5]

Figure 1C:
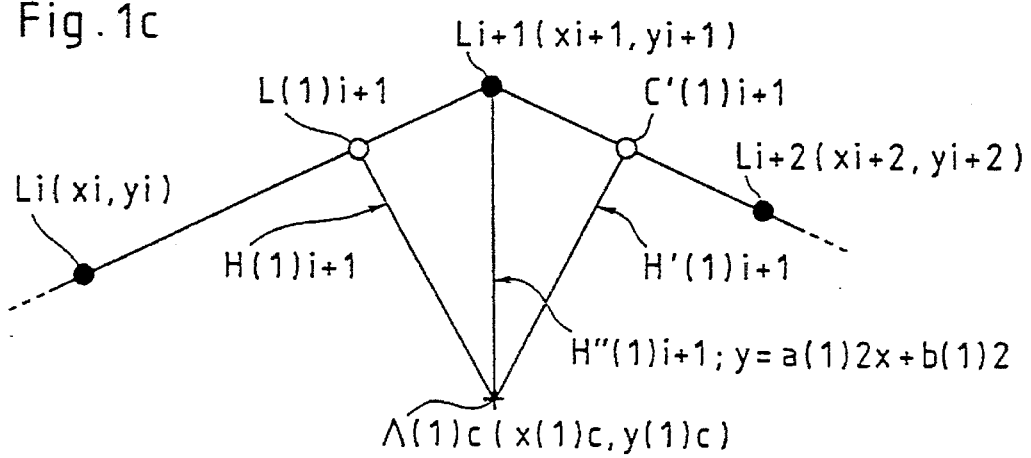

The equation of a vertical line H(1)i+1 extending from the point L(1)i+1 perpendicular to the straight line between Li and Li+1 shown in FIG. 1c is expressed as follows:
when yi≠i+1, $$y = \{-1/a(1)1\}x + x(1)i+1 \cdot [a(1)1 + \{1/a(1)1\}] + b(1)1 \quad (19),$$

and when yi=yi+1, $$x = x(1)i+1 \quad (20)$$

[CAL. 6]

Similarly, the equation of a vertical line H'(1)i+1 extending from the point C'(i)i+1 perpendicular to the straight line Li+1 Li+2 shown in FIG. 1c is expressed as follows:
when yi+1≠i+2, $$y = \{-1/a(1)3\}x + x'(1)i+1 \cdot [a(1)3 + \{1/a(1)3\}] + b(1)3 \quad (21),$$

and when yi+1=yi+2, $$x = x'(1)i+1 \quad (22)$$

[CAL. 7]

Figure 1D:
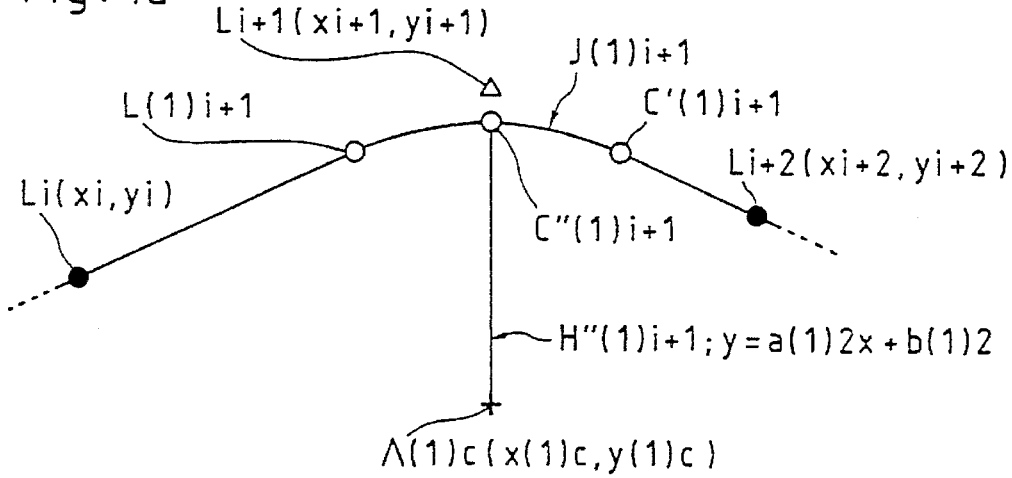

The center of a circular arc J(1)i+1 adjoining the straight line Li Li+1 at the point L(1)i+1 and the straight line Li+1 Li+2 at the point C'(1)i+1 can be defined as the position of an intersection of the two vertical lines H(1)i+1 and H'(1)i+1 as is obvious from FIG. 1d. As long as the teaching point Li+1 is a bending point between two linear segments, these two straight lines always intersect at intersecting point Λ(1)c. The intersecting point is represented by values (x(1) c,y(1)c). The values x(1)c and y(1)c can be determined by solving the simultaneous equations (19) or (20) and (21) or (22).

More particularly, when yi≠yi+1 and yi+1≠yi+2, the values are obtained by solving the simultaneous linear equations (19) and (21); when yi=yi+1, by solving the simultaneous linear equations (20) and (21); and when yi+1=yi+2, by solving the simultaneous equations (19) and (22). It should be noted that yi=yi+1=yi+2 is impossible.

[CAL. 8]

To obtain an equation representing a straight line passing the provisional teaching point Li+1 and the point Λ(1)c, x(1)c, y(1)c, xi+1 and yi+1 are used, thereby obtaining the following equations (23) through (26):
when x(1)c≠xi+1, $$y=a(1)2x+b(1)2 \tag{23}$$

$$a(1)2=\{yi+1-y(1)c\}/\{xi+1-x(1)c\} \tag{24}$$

$$b(1)2=-\{x(1)c.yi+1-y(1)c.xi+1\}/\{xi+1-x(1)c\} \tag{25},$$

and when x=xi+1, $$x=xi+1. \tag{26}$$

[CAL. 9]

The intersection of the circular arc J(1)i+1, passing the points L(1)i+1 and C'(1)i+1 and having its center at point A(1)c and the above-described straight line H"(1)i+1 is to be obtained.

Equation to represent circular arc J(1)i+1 is expressed as:

$$\{x(1)c - x\}^2 + \{y(1)c - y\}^2 = d^2 \tag{27}$$

$$\text{where } d2 = \{x(1)c - x(1)i + 1\}^2 + \{y(1)c - y(1)i + 1\}^2 \tag{28}$$

$$= \{x(1)c - x'(1)i + 1\}^2 + \{y(1)c - y'(1)i + 1\}^2$$

Thus, coordinate values (x"(1)i+1,y"(1)i+1) of the intermediate point C"(1)i+1 which defines the circular arc J(1) i+1 is obtained by solving the above equations (27), (28), (23)–(25), or (27), (28) and (26) as the systems of quadratic equations in x and y.

Through the processing according to the above-described calculations Cal. 1 to Cal. 9, the bent linear operation line extending from Li to Li+1, Li+2 ... can be replaced with the operation line extending from Li to L(i)i+1, C"(1)i+1, C'(1) i+1, Li+2 ... along which the direction of the movement can smoothly be changed. The provisional teaching point corresponding to the bend denoted by Δ is eliminated from the teaching line for the robot, and the points L(1)i+1, C"(1)i+1, C'(1)i+1 defining the circular arc J(1)i+1 are newly added in order to be used as the teaching points together with the points Li and Li+2 on the original data which are not eliminated. Symbols L and C for newly defined points are used for representing types of route environment. For the meanings and contents of these symbols, refer to the indicator setting rule which will be described later.

If there are two or more bends on the operation line, the data of teaching line not including the bend is created by applying to each bend the processing including the previously described calculations. When there are two or more bending points, in order to avoid the confusion of names with those of the teaching points or provisional teaching points, the symbols such as (1), (2), ... (n) are added to the points and coefficients to be newly defined along the operation line relating to the first, second ... n-th bending points so that they are expressed in the forms such as L(1)i+1, C'(1)i+1, C"(1)i+1, a(1)1, b(1)1 for distinction. The above example is based on the first bend of operation line. For the calculation processing for inserting circular arc segment at the second bending point and the following bending points, the procedures of previously described Cal. 1–Cal. 8 are applicable by replacing, for example, L(1) with L(2) ... L(n), etc.

In this manner, when the modified teaching line data is obtained from the original data, using the methods respectively described in the specifications of aforementioned laid open Japanese patent application Nos. 5-59463 and 5-89511 under the condition that the robot is taught to maintain the specified posture with respect to the teaching line, a highly efficient off-line teaching can be realized.

The present invention will be described in more details taking a case in which the off-line teaching of the position and posture is applied to the robot using the data modified through the software processing by a personal computer, based on the condition that the CAD data representing the operation line is available with respect to the workpiece including a bend linear segment as an object of deburring work.

Described in the following referring to FIG. 2a–FIG. 6 is process, in which representative points (hereinafter referred to as joining points) which join a straight line segment and circular arc segment of the deburring path (operation line) and their data in a CAD system are picked out; air-cut points on the sides of start and terminal points are additionally defined, and indicators including the type of route environment are added to each of the joining points and the air-cut points.

FIG. 2a illustrates an example of the operation line displayed on a CAD screen. The operation line consists of straight line segments 1, 2 and 3, a circular arc segment 4, and a straight line segment 5 which form a path including bends and a curved segment along the outer edge of a workpiece K denoted by the dot area, thereby forming a continuous line as the whole.

Although the operation line normally coincides with the contour of the workpiece K, it may be shifted outwards or inwards from the contour depending on the situation. It is also possible to provide a plurality of the work paths for a single workpiece.

The operation line comprising the straight line segments and the circular arc segment, so that it can be defined by coordinate value data of the terminal points E and E' and the joining points F, F', V, V' among segments and an intermediate point G of the circular arc segment are picked out on the CAD screen to let them represent the operation line.

As the methods for picking out the points E, E', V, V', F, F' representing the operation line, there are a method in which a program is preloaded in the CAD system for extracting and displaying the terminal points of a straight line segments, the terminal points and an intermediate point circular arc segment, and the joining points between the segments, and another method in which the representative points on an operation line displayed on a screen are specified by an operator using a light pen or cursor and read them by a tool provided in the CAD system.

The coordinate data are represented in a coordinate system Σc provided by the CAD program. The values in this embodiment are as given in a table of FIG. 2b.

After the representative points are picked out, one of the two terminal points E and E' is defined as a start point of operation line and the other as the terminal point of an operation line depending on the direction of the movement of the robot, and air-cut points respectively corresponding to the start point and terminal point are defined. Both the air-cut points for the start and terminal positions are determined so that the robot will not interfere with the workpiece and peripheral equipments during the deburring operation.

In this embodiment, the air-cut point on the side of the start point is set to the coordinates (15,30), and the air-cut point on the side of terminal point is set to the coordinates (15,10). These air-cut points on the start point side and terminal point side and the other specified points are accompanied by serial numbers 1 to 9 representing their positional order on the operation line of the robot so that they are denoted as Q1 to Q9. The coordinate data of the points Q1 to Q9 are listed in a table of FIG. 3b.

Since the points Q1 to Q9 lie on a plane, when data along the axis Z is defined as Z=0, and the coordinate values of the points Q1 to Q9 are defined as data of the teaching points, the data for determining the posture of the robot is made available at this stage. The robot posture, however, needs to be controlled through the teaching for maintaining a best orientation for executing deburring operation. In most instances, the robot posture in performing typical deburring operation is dependent on the direction of the operation line. More specifically, it is essential for the robot posture to maintain a constant positional relation between the effecter of the robot and the operation line during a specific operation (e.g. deburring or painting) along the operation line.

When bending points such as Q3 and Q4 in this embodiment exist between the straight line segments of the operation line, as described previously, they have to be replaced with circular arc segments having a small diameter.

In this embodiment, the information including the type of path environment is assigned to the points Q1 to Q9 so that the processing for the insertion of the circular arc based on the software processing using such information, and the teaching data for controlling the posture of the robot can be created.

Indicators (names) A, L and C representing types of the path environment are added to the points Q1 to Q9 shown in FIGS. 3a and 3b according to the following rules 1 to 3.
Rule 1: Indicator A is attached to the air-cut point.
Rule 2: Indicator L is attached to the terminal point of straight line segment (including both an approach line and an escape line) other than the air-cut point.
Rule 3: Indicator C is attached to the intermediate or terminal point of circular arc segment.

Figures 4A, 4B:
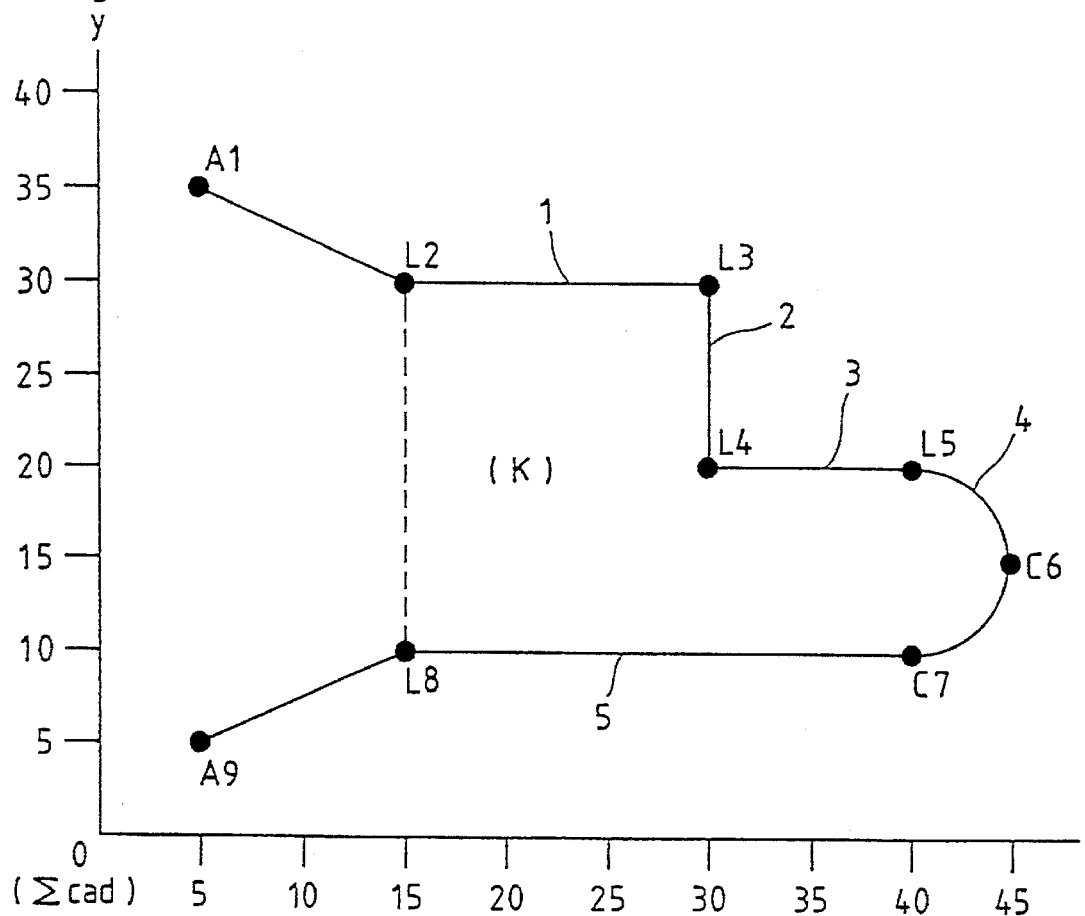

Through the application of the these rules, the data shown in FIGS. 4a and 4b can be obtained. The indicator can be attached automatically if a program for this purpose including that for application of the above rules is preloaded in the CAD system; however, if the CAD system includes a step for assigning or writing the indicators to respective teaching points in manual mode, the assigning of the indicators can be executed manually by an operator. It is also a practical method to transfer the CAD data extracted and defined at the stage of FIGS. 2 or 3 to another programming device.

For example, the CAD data may be converted at the stage of FIGS. 2 or 3 into MS-DOS forms which can be handled easily with a commercially available microcomputer so that the definition of and attachment of indicators to the start, terminal, and air-cut points can be executed either manually or software input through the microcomputer.

In this embodiment, the steps up to the preparation of the data corresponding to those of FIGS. 4a and 4b are carried out by the CAD system for efficient teaching work with the best use of CAD data. The attachment of the indicators is executed by the CAD system according to the indicator attachment sub routine based on Rules 1, 2 and 3.

Figure 5:
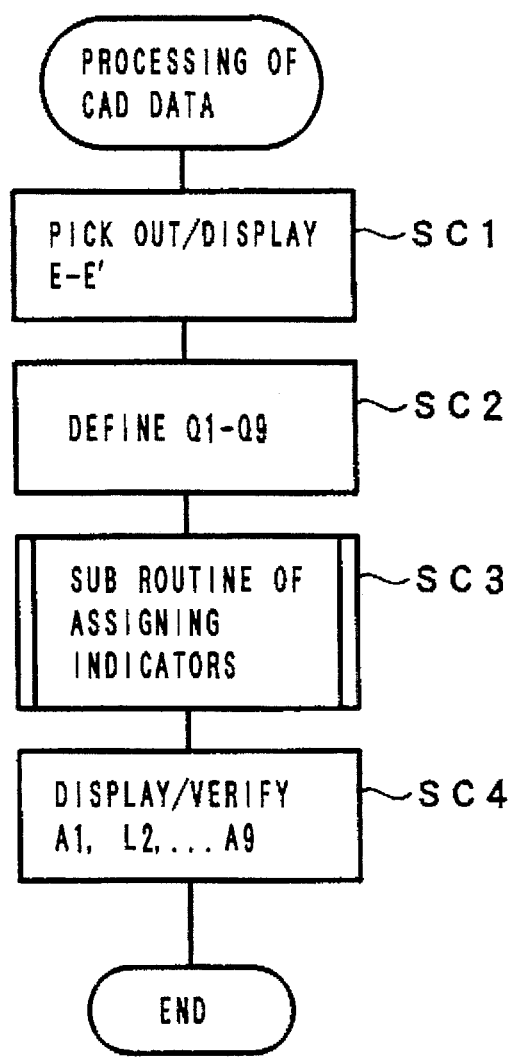
FIG. 5 is a flow chart illustrating the outline of the processing of CAD data to be executed by a CAD system.
Figure 6:
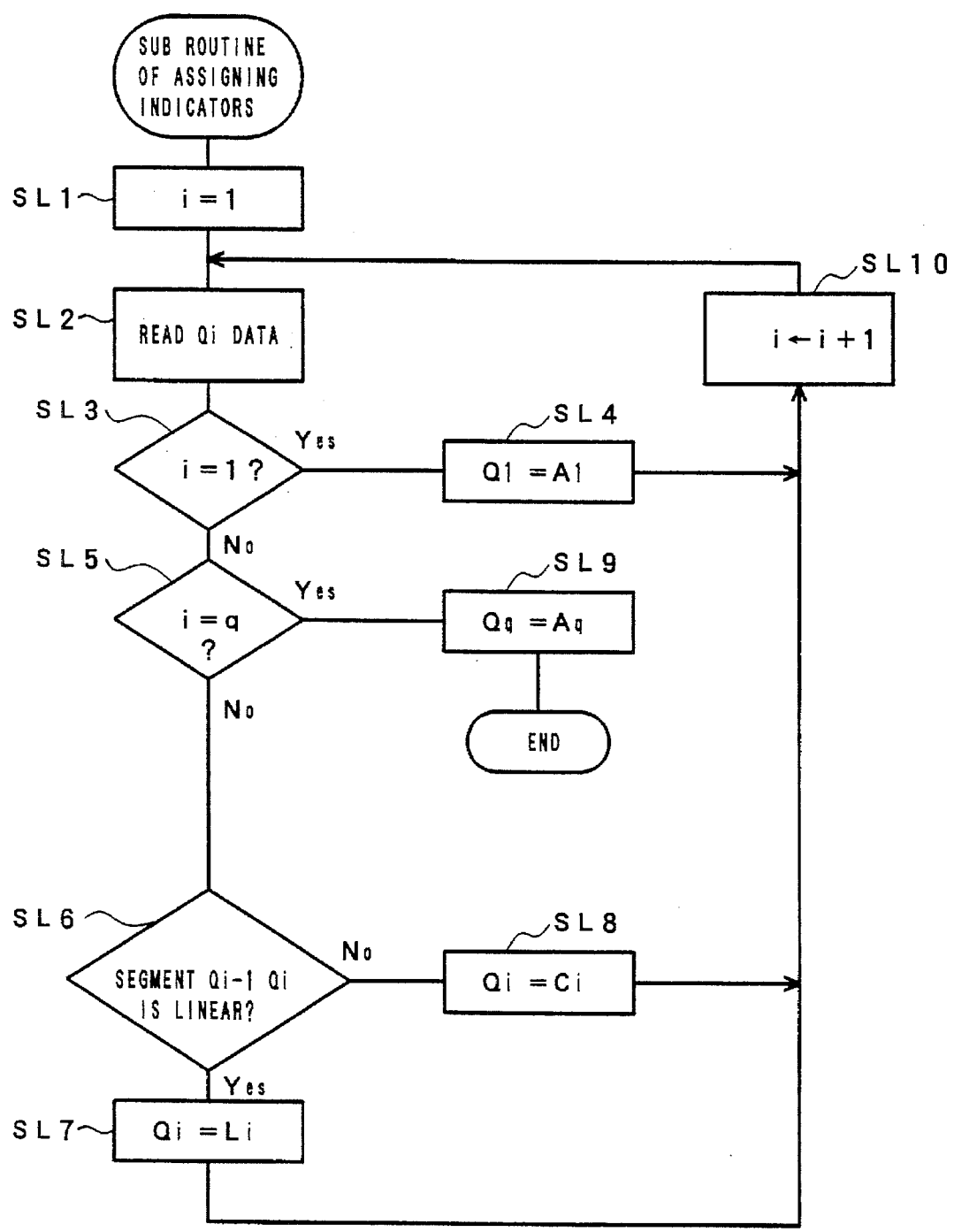
FIG. 6 is a flow chart explaining the outline of processing by a sub routine program for assigning the indicators.

The outline of data processing by the CAD system will briefly be explained referring to the flow chart of FIG. 5.

In the first step of processing of the CAD data starts with retrieval of the graphic form of an operation line of a workpiece to be machined and its related data from a memory in the CAD system and displays representative points E—E' on a display screen of the CAD system in the form shown in FIG. 2, a tool provided with the CAD system (Step SC1).

The operator selects the start and terminal points of working, defined the air-cut points Q1 to be located before the start point and Q9 to be located after the terminal point, defines each linear segment starting from each air-cut points by the CAD data as shown in FIG. 3, attaches the symbol Q to all the points including these air-cut points, and attaches numerals 1 to 9 along the direction of the movement of the robot to denote the points as Q1 to Q9 (Step SC2).

These teaching points Q1 to Q9 may differ from actual teaching points due to the substitution of circular arc segments and thus referred to as provisional teaching points.

Whether which of the terminal points E and E' is to be picked out as start point of working may be determined in consideration of positional relationship between the robot and the workpiece and form and condition of the operation line for deburring.

After the provisional teaching points Q1 to Q9 are determined in the direction of a robot movement, the indicators A, C and L are added to these provisional teaching points according to Rules 1, 2 and 3.

The attaching of the indicators may be executed by manually assigning A, L and C respectively to the provisional teaching points displayed on the display screen using a light pen, mouse or keyboard entry. For higher efficiency, however, the processing by the sub routine conforming to Rules 1, 2 and 3 is performed by the CAD system (Step SC3). The outline of the processing by this sub routine in shown in FIG. 6.

To describe, the first provisional teaching point number index i is reset to 1 (Step SL1). Then, data relating to teaching point Qi is retrieved (Step SL2), and it is examined whether or not i=1 (SL3). Since the first air-cut point Q1 on the side of start point, the result of judgment is YES, so that the indicator A is attached to Q1 data to become Qi=Ai (Step SL4).

When i≠1, it is examined whether or not the provisional teaching point index has reached the predetermined level at which i=1 (Step SL5). In this embodiment, q=9. When i=q(=9), the indicator A is added according to Rule 1 to obtain Qq=Aq (Q9=A9) (Step SL9). At this stage, the processing for i=1 to 8 have been finished, so that, at the end of Step SL9, all the provisional teaching points are accompanied by the indicators A, L and C.

When 2≦i≦8, the result of judgment is NO at Step SL5, and the processing goes to Step SL6. At Step SL6, it is examined by the CAD data whether the segment Qi-1 to Q1 is a linear segment or circular arc segment. If it is the straight line segment, the indicator L is added according to Rule 2 to obtain Li (Step SL7). If it is the circular arc segment, the indicator C is added according to Rule 3 to obtain Ci (Step SL8).

FIG. 3 shows the case where L is added to i=2 to 5 and i=8 while C is added to i=6 and i=7.

When the processing has advanced to any of the steps SL4, SL7 and SL8, it returns to Step SL2 after adding 1 to the provisional teaching point number index i (Step SL10). If the processing returns to Step SL2 when i=9, the processing proceeds, as described previously, from Step SL5 to Step SL9 to finish the sub routine processing for adding indicator, and then proceeds to Step LC4 after returning to the steps shown in FIG. 5. In the end, the data shown in FIG. 4 are produced based on the data of FIG. 3 by the sub routine of Step SC3.

This data are then displayed on the screen for verification (Step SC4) to terminate the CAD data processing.

At this stage, the original data are ready for the substitution of circular arc segments. This stage may be followed by the processing for the substitution of circular arc segments by the CAD system; however, the data is converted into an MS-DOS text file format for use in a commonly available microcomputer before proceeding to further steps.

More particularly, the CAD data shown in FIG. 4 is converted into an MS-DOS text file form on a memory of the microcomputer using an appropriate conversion software. In addition, programs for executing the processing for the substitution of circular arc segments including the program for executing the previously described calculations Cal. 1 to Cal. 9 and the program for calculating robot posture teaching data which will be explained later in more details are loaded in the microcomputer together with relevant setting parameters.

Figure 7:
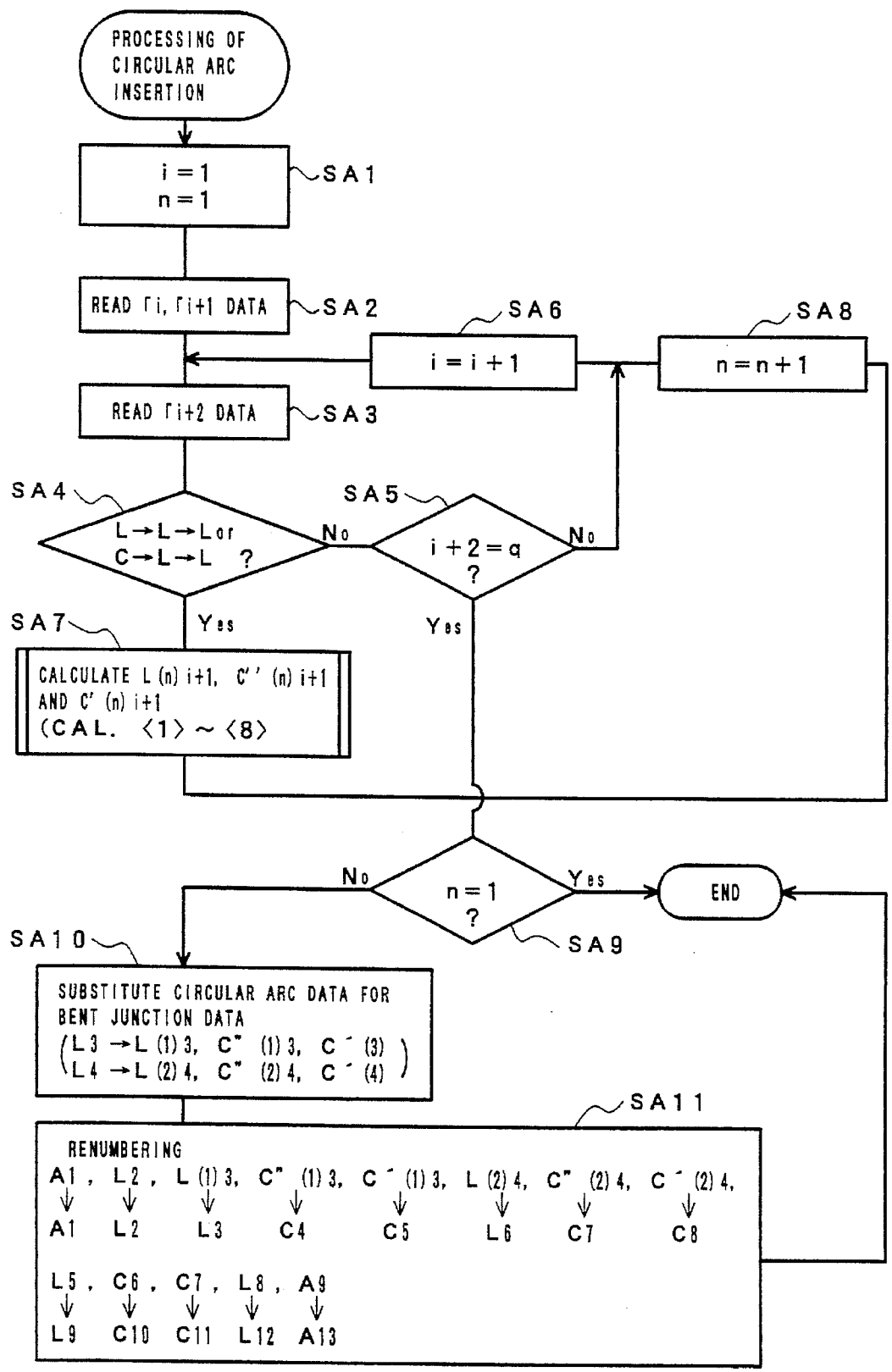
FIG. 7 is a flow chart showing outline of software processing for replacing the bend at the junction of linear segments with a circular-arc of small radius and for preparing the teaching data of the three points for defining the circular arc.

The outline of processing for the substitution of circular arc segments will be described referring to the flow chart of FIG. 7.

First the provisional teaching point number index i (an index indicating i-th provisional teaching point) and the bending point index n (an index indicating n-th bending point) are set to 1 respectively, or inputted as i=1 and n=1 (Step SA1). Then, the data of Γi, Γi+1 and Γi+2 representing the i-th, (i+1)th and (i+2)th provisional teaching points are retrieved in a sequence (Steps SA2 and SA3). The Γ is a symbol generally representing A, L and C. For example, the data in FIG. 4 are expressed as Γ1=A1, Γ2=L2, Γ3=L3, and so on.

Upon reading the data of three consecutive points, it is examined whether or not these points are bending points among linear segments. More specifically, it is judged that the linear segment include a bending point when these three points have a relationship of L→L→L or C→L→L (Step SA4). If A→L→L or L→L→A, there appears to be a bending point. However, the substitution of circular arc segment is not needed if the robot posture at any air-cut point A is adjusted to coincide with the posture at its preceding or succeeding point L. Thus, such criterion of judgment is applicable.

In the case of FIG. 4 where A1→L2→L3, the result of the initial judgment is NO, and after examining whether there is any unretrieved teaching point or not (Step SA5), the processing proceeds to Step SA6 where the provisional teaching point number index i is increased by 1 and returns to Step SA3. Then, data of the next provisional teaching point L4 is read and examined again at Step SA5 for judgment with reference to the previously retrieved data of L2 and L3.

When YES is given upon examining the data of L2, L3 and L4 at Step SA5, the processing proceeds to Step SA7 for executing a first substitution of circular arc segment. The content of calculation processing for replacing a linear segment with circular arc segment is as described previously.

The calculation processing of previously described Cal. 1 to Cal. 9 is executed for (n) to determine the positions of newly defined points L(n) i+1, C"(n)i+1 and C'(n)i+1 relating to the n-th bending point Li+1 (Step SA7). In the case shown in FIG. 4, a circular arc segment is inserted at the bending point L3 for the first time (n=1), so that the positions of L(1)3, C"(1)3 and C'(1)3 are determined as newly defined data.

After executing the calculation for the insertion of circular arc at bending point Li+1 (L3 for the first time), the processing advances to Steps SA8 and SA6 where 1 is added to the bending point index n and provisional teaching point index i respectively before returning to Step SA3. At Step SA3, data of the following provisional teaching point Γi+2 is retrieved and examined for judgment for the same purpose as in Step SA4 with reference to the data of Γi and Γi+1. When the terminal point is designated as an air-cut point (A9 in FIG. 4), the preceding provisional teaching point (L8 in FIG. 4) is not for the circular arc segment substitution. Therefore, i+2=q (q being the total number of teaching points, and q=9 in FIG. 4) never hold at the end of Step SA7.

In the case of FIG. 4, when the processing proceeds to Step SA4 at the stage of i=3, YES for the second time is given (n=2), and the processing proceeds to Step SA7 to execute the calculation for the insertion of circular arc at bending point L4. The content of calculation processing is basically the same as that for the insertion of circular arc segment at preceding point L3, and the positional data of L(2)4, C"(2)4 and C'(2)4 are obtained as the data of newly defined points as the result of this processing.

When the points exist in succession like the cases of points L3 and L4, the part of calculation for Cal. 1 to Cal. 9 can be replaced with previously calculated data (ex. equations of straight line between L3 and L4 has been calculated at the time of processing for insertion of circular arc at point L3). The data of point of L3 may be replaced with that of point C(1)3. In that case, it is also possible that the data of L3 is deleted upon completion of the circular arc segment substitution for L3 while the data of L(1)3, C"(1)3, and C'(1)3 are substituted.

After Step SA7, the processings from Step SA8 to Step SA6, Step SA3 and Step SA4 are repeated. When Γi+1 is not a bending point (L2, L5, C6, C7 or L8 in FIG. 4), judgment of NO is given in Step SA4, and the processing goes to Step SA5 where it is examined whether there are any unexamined provisional teaching point are left or not. As long as i=q (=9) does not hold, the processing proceeds to Step SA6 and returns to Step SA3.

Thus, as many bending points as the number of times of YES given in Step SA4 are the objects of circular arc insertion. Finally, under the condition that i+2=q (=9), the processing proceeds to Step SA4 (judgment is always NO due to previously described reason) and then to Step SA5 where judgment of YES is given for the first time, and it is checked if circular arc insertion is necessary or not.

If there is no bending point included among the provisional teaching points Γ1 to Γq (A1 to A9), the circular arc segment substitution is not executed at all, so that n=1 still holds, and the processing is terminated. When n≠1 (n=3 in the case of FIG. 4), this indicates that the insertion of circular arc has been executed for as many as n−1 bending points, so that the processing proceeds to Steps SA10 and SA11 in sequence to execute the processing to rewrite the provisional teaching point data into actual teaching point data.

At Step SA10, the unnecessary data of the provisional teaching points (bending point) are deleted, and newly defined data of points representing circular arc segments are introduced. When the number of bending points is N, the data of 3N circular arc segments must have been obtained. In the case of FIG. 4, the unnecessary provisional teaching points are L3 and L4, so that the data of L3 and L4 are replaced with data of new points L(1)3, C"(1)3, and C'(1)3 and L(2)4, C"(2)4, and C'(2)4 to define the circular arc (See FIG. 1). As the result, the positional and indicator data of 9−2+(2×3)=13 points are obtained.

In Step SA11, for later processing, with indicator names A, L and C remain unchanged, the points are renumbered by uniformly adding serial numbers to determine actual teaching points. In the case shown in FIG. 4, the teaching points to be determined are 13 points A1, L2, L3, C4, C5, L6, C7, C8, L9, C10, C11, L12 and A13. The derivations of the points are as illustrated in the flow chart of FIG. 7. Upon determination of all the teaching points, the processing is ended.

Figure 8:
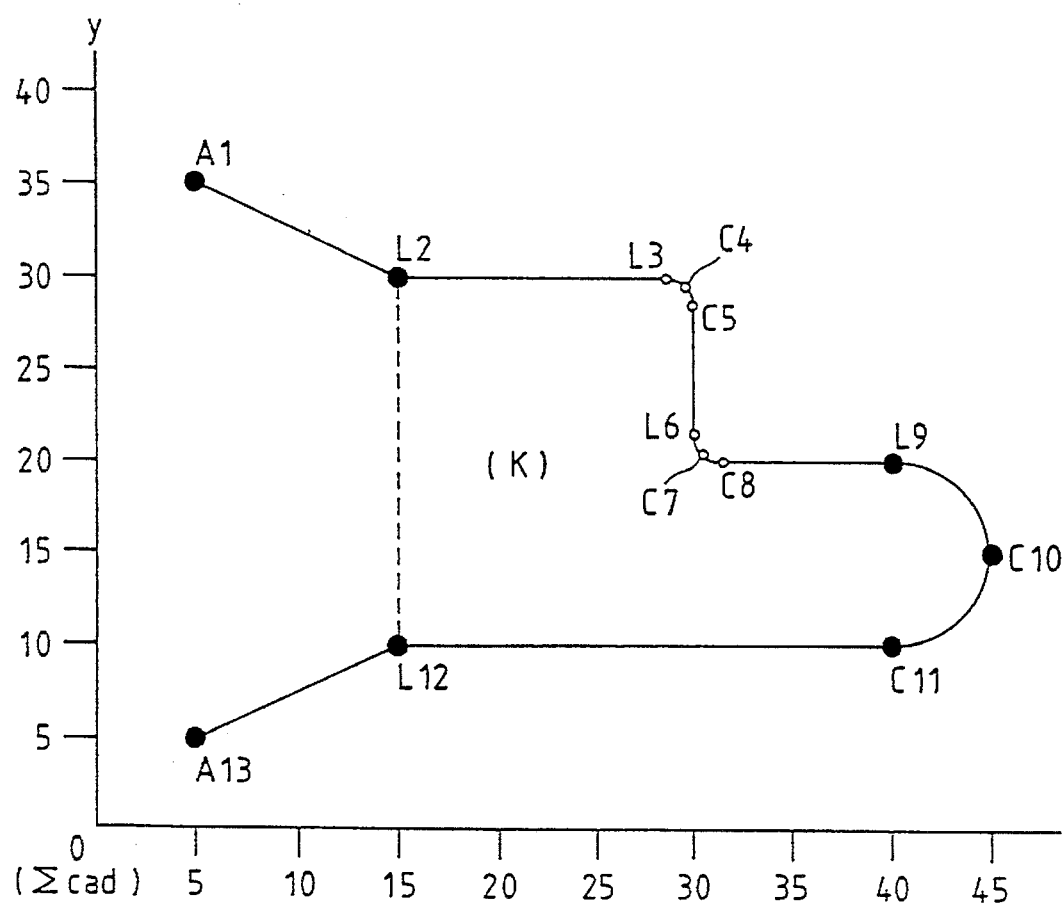

By modifying the original data shown in FIG. 4, the data to represent the operation line of a robot as shown in FIG. 8 can be obtained. The teaching data to determine the posture of the robot is created based on the obtained data.

A procedure for producing robot posture teaching data based on the data shown in FIG. 8 and by a software will be described with respect to the case of the working such as the deburring work where the robot is required to maintain a specific posture relative to an operation line to be traced.

In order to teach the robot its three-dimensional position and posture, a data of (X,Y,Z;W,P,R) is necessary. X, Y and Z represent position of an origin of the tool coordinate system $\Sigma t$ in the workpiece coordinate system $\Sigma w$ of the robot. W, P and R are variables representing the angular positions of the tool coordinate system $\Sigma t$ about the X, Y and Z axes of workpiece coordinate system $\Sigma w$.

The relationship between the workpiece coordinate system $\Sigma w$ and the tool coordinate system $\Sigma t$ and the relationship between a tool and a workpiece (an operation line) may be determined in view of the ease of conversion of coordinate values and the type of an operation. In this embodiment, the relationships are determined for the deburring operation as shown in FIG. 9.

Figure 9:
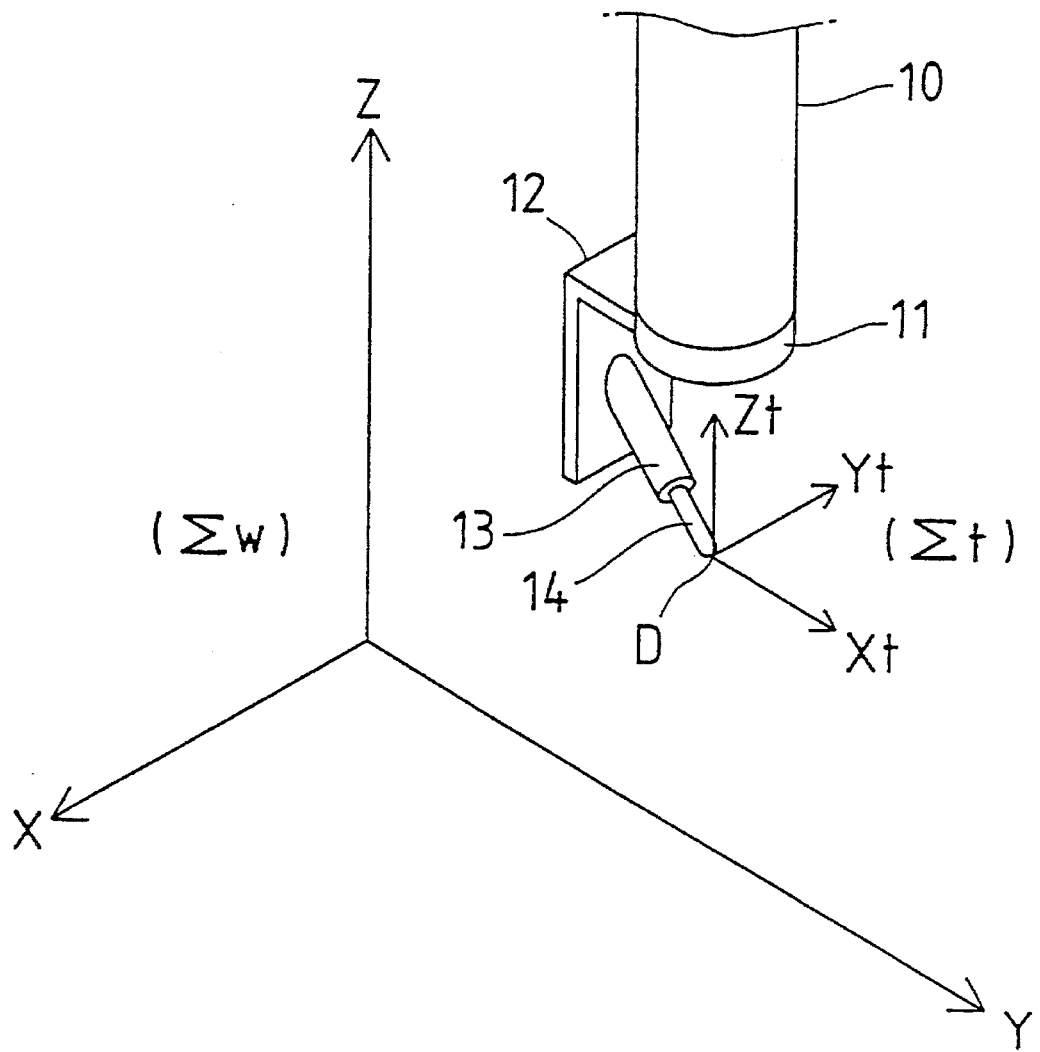
FIG. 9 shows the relation between a workpiece coordinate system $\Sigma w$ and a tool coordinate system $\Sigma t$, and the relation between a tool and an operation line for a workpiece.

Referring to FIG. 9, a deburring tool 13 is attached through a tool support 12 to a tool holder 11 which is mounted on the wrist manipulator end of a robot 10. The deburring tool 13 has a deburring blade 14 mounted on the distal end thereof and driven while being pressed against a deburring point (a machining point) D. The origin of the tool coordinate system $\Sigma t$ is made to coincide with the deburring point D. The Z-axis Zt of the tool coordinate system $\Sigma t$ is always kept in parallel to the Z-axis of the workpiece coordinate system $\Sigma w$. The projected line of extending line of deburring blade 14 projected on the Xt-Yt plane is slightly tilted with respect to Xt axis, and the Xt axis crosses at a right angle with the operation line when the deburring posture is taken by the robot.

The X-Y plane of the workpiece coordinate system $\Sigma w$ is made to coincide with the x-y plane of a coordinate system ($\Sigma cad$ or $\Sigma pc$) of a CAD data or equivalent MS-DOS data. When the i-th teaching point from the starting air-cut point A1 (i ranging from 1 to 13) is named $\Gamma i$ ($\Gamma 1=A1$, $\Gamma 2=L2$, $\Gamma 3=L3$, $\Gamma 4=C4$, $\Gamma 5=C5$, ..., $\Gamma 12=L12$ and $\Gamma 13=A13$), the workpiece coordinate data are expressed as:

$$Xi=xi, Yi=yi, Zi=0 \qquad (29),$$

and

Wi(angular position about X axis)=Pi(angular position about Y axis)=0  (30)

Ri(angular position about Z axis) is determined according to rules of the following sub routines 1 to 5. One of the sub routines is selected depending on the indicator attached to each teaching point or the preceding or succeeding teaching point. The performance of Sub routines 1 to 4 are dependent on the relationship between the workpiece and the tool.

[SUB ROUTINE 1]
Conditions of selection:
  $\Gamma i=Li$ or Ci and $\Gamma i+1=Li+1$.
Description of rule:
  A vector $<Ti>$ vertical to the vector $<\Gamma i\Gamma i+1>$ on the X-Y plane is determined by Equation 4:

$$<Ti>=R(\theta)<\Gamma i\Gamma i+1> \qquad (31)$$

where $R(\theta)$ is a rotation matrix for rotating an arbitrary vector leftwards by an angle $\theta$ with respect to Z axis on the X-Y plane. The rotation angle $\theta$ is determined by selecting either $+90°$ or $-90°$. The selection is made by the following rule.

$-90°$ is selected in the case where the robot has to be advanced along the workpiece located on the right side of the direction of advance, overlooking the operation line on the X-Y plane from (+) direction of Z-axis, while $+90°$ is selected in the case where the robot is to be advanced along the workpiece located on the left side of the direction of advance. For convenience, the former case where the workpiece is on the right side of the forward movement direction of the robot is referred to as Case 1, and the latter where the same is on the left side is referred to as Case 2. An angle between the vector $<Ti>$ and the X axis (a unit vector Ex on the X axis) is then designated Ri.

In the case shown in FIG. 8, the robot travels along the workpiece K located on the right side, passing in the order of A1→L2→L3→C4→C5→. . . →L12→A13 (in clockwise, for working outside of the workpiece), and so $\theta=-90°$ is selected for the teaching points L2, C5, C8 and C11. In other words, sub routine 1 is applied to the four teaching points L2, C5, C8 and C11, and R2=$-90°$, R5=$180°$, R8=$-90°$ and R11=$90°$ hold as the values of R.

[SUB ROUTINE 2]
Condition of selection:
  $\Gamma i+1=Ci+1$, and $Ci+1$ is an odd numbered C point counting from the start point of an operation line.
Content of rule:
  When $\Gamma i$ satisfies the above two conditions, $\Gamma i+2$ can also be a C point. Because, since each circular arc segment is always corresponds to three teaching points, any odd numbered C point can never represent an end point but an intermediate point of a circular arc segment.

The coordinate values $(Xi0,Yi0)$ of the center Ai of a circular segment is calculated from the coordinate data $(Xi,Yi)$, $(Xi+1,Yi+1)$ and $(Xi+2,Yi+2)$ of the three points $\Gamma i$, $Ci+1$ and $Ci+2$ to obtain its vector $<Ai\Gamma i>$. Vector $<Ti>$ is obtained according to the same rule of classification as the rule of sub routine 1, and an angle between the vector $<Ti>$ and the X axis (a unit vector Ex along the X axis) is designated Ri.

More specifically, in the Case 1 (the workpiece is located on the right side of the forward movement direction), $$<Ti>=-<Ai\Gamma i> \qquad (32)$$

In the Case 2 (the workpiece is located on the left side of the forward movement direction), $$<Ti>=<Ai\Gamma i> \qquad (33)$$

In the case shown in FIG. 8, the teaching points conforming to the conditions of sub routine 2 are L3, L6 and L9. As described previously, the case shown in FIG. 8 corresponds to the Case 1, the vectors $<T3>=-<A3L3>$, $<T6>=-<A6L6>$, $<T9>=-<A9L9>$ are obtained for each teaching point, and R3=$-90°$, R6=$180°$ and R9=$-90°$ are determined as the angles between the vectors $<T3>$, $<T6>$ and $<T9>$ and the unit vector Ex in X-axis direction.

L3 and L6 are followed by the circular arc segments which have been produced by the circular arc segment insertion processing, and the coordinate data of centers $A(1)c$ and $A(2)c$ of the circular segments have been calculated through the circular arc segment insertion processing (by Cal. 7). Thus, the identification information to identify the teaching point relating to the circular arc insertion is attached to the corresponding teaching point so that the data acquired for such teaching point through the circular arc insertion processing is retrieved, and such procedure may take the form of sub routine. Other processings requiring the coordinate data of center of circular arc segment may also be executed in the same manner.

[SUB ROUTINE 3]
Condition of selection:

Γi+1=Ci+1, and Ci+1 is an even numbered C point counting from the start point of an operation line.

Content of rule:

When Γi satisfies the above conditions for selection, Γi represents an odd numbered C point. Thus, the point Ci is on a circular arc segment including Γi−1. The center of the circular arc segment is Λi−1 as calculated by sub routine 2 (or retrieved from the circular arc segment processing data). The processing by sub routine 2 for the teaching point Γi−1 is always executed prior to the processing by sub routine 3.

After <ΛiΓi−1> is determined, vector <Ti> is calculated according to the same rule of classification as the rule of sub routine 1. Then, an angle between the vector <Ti> and the unit vector Ex along the X-axis is designated Ri. More specifically, in Case 1, (the workpiece is located on the right side of the direction of the forward movement), $$<Ti> = -<\Lambda i-1\Gamma i> \quad (34)$$

In Case 2, (the workpiece is on the left side of the direction of forward movement), $$<Ti> = <\Lambda i-1\Gamma i> \quad (35)$$

In the case shown in FIG. 8, the teaching points conforming to the conditions of sub routine 3 are C4, C7 and C10. As described, the case shown in FIG. 8 corresponds to Case 1, so that vector <T4> = -<Λ3C4> is obtained for C4. An angle between the vector <T4> and the unit vector Ex on the X axis is determined as R4=−135°. Similarly, R7=45° and R10=180° are determined.

[SUB ROUTINE 4]
Condition of selection:

Γi+1, Γi+1=Ai+1 is valid, and Γi+1=Ai+1, or Γ is not valid.

Description of rule:

(I) When Γi=Li or Γi=Ai, Ri=Ri−1. In other words, the robot is taught the same posture as that at immediately preceding teaching point. In this case, the segment Γi−1 Γi is a straight line segment, and the succeeding teaching point Γi+1, if given, is an air-cut point. Thus, it is obvious that the posture same as "posture along the straight line segment "=" posture taught at Γi−1" is applicable. Γi+1=Ai+1 and Γi=Ai means that both Ai and Ai+1 are the air-cut points in succession. Such situation occurs when two or more air-cut points are allocated to the start or terminal point of an operation line or when an air-cut point at the terminal of one operation line has to be connected to an air-cut point at the start point of another operation line.

(II) When Γi=Ci, Ci is always an even numbered C point and thus on circular arc segment including Γi−1 and Γi−2. The center of the circular arc segment is Λi−2 determined by sub routine 2.

After vector <ΛiΓi−2> is obtained, vector <Ti> is obtained according to the case determined by the rule of sub routine 1. Then, an angle between the vector <Ti> and the unit vector Ex along the X axis is designated Ri.

More specifically, in the Case 1 (the workpiece is located on the right side of the forward movement direction), $$<Ti> = -<\Lambda i-2\Gamma i> \quad (36)$$

In the Case 2 (the workpiece is located on the left side of the forward movement direction), $$<Ti> = <\Lambda i-2\Gamma i> \quad (37)$$

In the case shown in FIG. 8, the teaching points conforming to the conditions of sub routine 4 are L12 and A13. As the case shown in FIG. 8 corresponds to the above case of (I), R12=R13=90° (=R11) is determined for L12 and L13. According to the case of FIG. 8, there is no teaching point corresponding to the above case (II).

[SUB ROUTINE 5]
Condition of selection:

Γi=Ai and Γi+1=Li+1

Content of rule:

In this case, Γi is supposed to be an air-cut point on the side of starting point, so that the posture at Γi should be identical with the posture to be taught at starting point Li+1 of the succeeding operation line in order prevent excessive load from acting on the robot and to simplify the processing for creating teaching data in rationalized way. In FIG. 8, R1=−90° (=R2) is given.

Figures 10A, 10B:
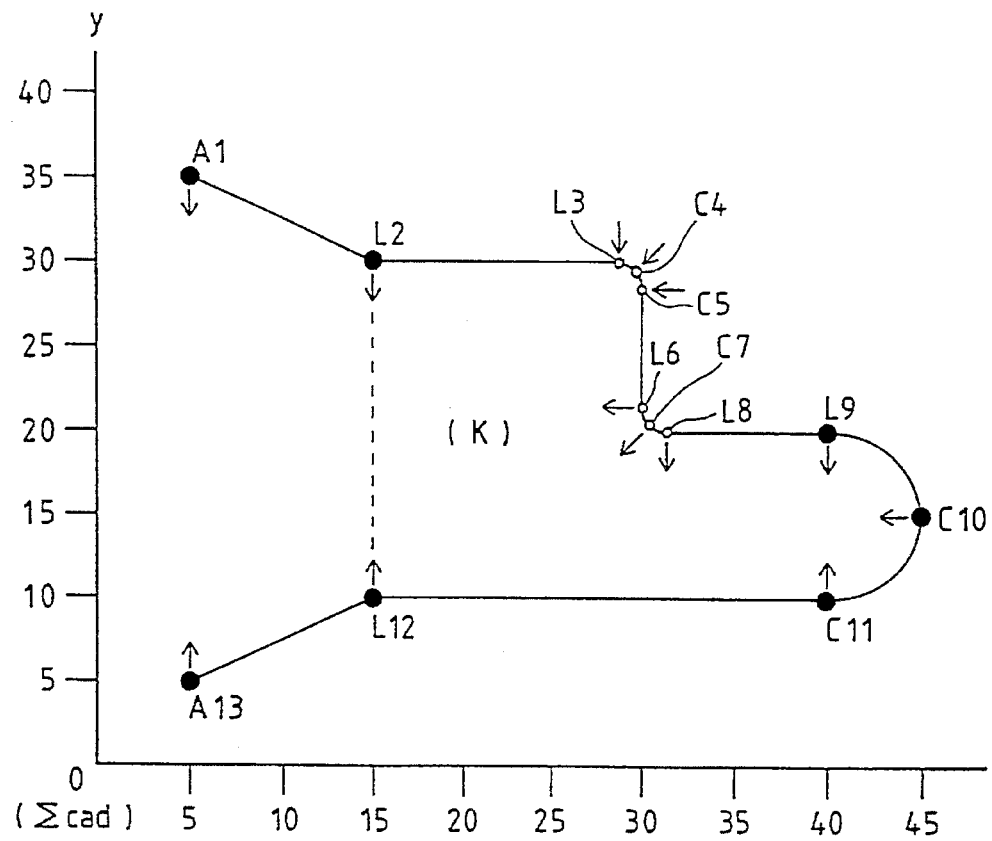
FIGS. 10a and 10b respectively show the content of the teaching data obtained by adding the robot posture data to the data processed for the insertion of the circular arc which shown in FIGS. 8a and 8b respectively.

Using the five sub routines for determining the posture in accordance with the rules set by condition of selection, Ri at each of the teaching points Γi can be obtained corresponding to all behaviors relating to order of arrangement of the teaching points Γi (with A, L and C). For the case shown in FIG. 8, the results of calculations executed using these sub routines are listed in FIG. 10 in accordance with the form of FIG. 8. In FIG. 10, each arrow represents a direction defined by Ri along the Xt axis of the tool coordinate system Σt.

As seen from the orientations of arrows, th posture of the robot is taught, based on the indicator added to each teaching point and the information concerning whether the workpiece is located on the right side or left side with respect to the direction of movement of the robot, so that the posture of the tool represented by the tool coordinate system Σt can be maintained as desired relative to the operation line (line). Paying attention particularly to the segment including L3, C4 and L6, and the segment including L6, C7 and C8, it will be clearly understood that the bending points re eliminated by the previously described circular arc insertion processing so that the robot is allowed to smoothly change its posture.

Needless to say, it is possible to differently modify the sub routines and the conditions of selection depending on the nature of the works to be done.

For example, a teaching such that the posture of the tool can be shifted selectively and finely towards a desired direction by a minute angle δ from the conditions shown in FIG. 8 at each teaching point in a segment corresponding to the section of the operation line for the workpiece can be realized by properly adding the processing for calculating Ri+δi to Ri to be calculated by the aforesaid posture calculating sub routine, and writing the rule of selection for enabling the processing for adding using A, L and C, or remaking the rule of selecting condition after adding or modifying the type and definition of the indicator.

An example of the teaching data calculation/preparation processing including the sub routines of determining the robot posture will be explained referring to FIGS. 11 to 16.

A program required for executing the processings shown in FIGS. 11 to 16 is loaded with various necessary set values in a personal computer. For specifying the position of a workpiece relative to the forward movement of the robot during the deburring operation, a mode flag MF for representing 0 (right-position mode) for normal forward movement and representing 1 (left-position mode) for reverse movement. The reversing of the mode flag is executed in advance by manual entry of an operator.

In this case, deburring operation is assumed to be executed in the right-position mode, so that the operation starts from the state of MF=0. If the left-position mode is desired, the mode flag is changed to 1 before starting the operation. After completing the above setting, the processing for calculation and production of the teaching data is commenced.

First, the teaching point number index i is set to 2 (Step SS1), and the data of i-th teaching point (type of indicators A, C, L and coordinate values xi and yi converted into text file data in MS-DOS format) is retrieved. It is then examined whether $\Gamma$i is the initial teaching point or not (Step SS3), and the proceeding proceeds to Step SS4 or SS17 depending on the result. The judgment in the first Step SS3 is made when i=2 and then followed by Step SS4 where data of the succeeding teaching point $\Gamma$i+1 ($\Gamma$3 in the first step) is retrieved. It is examined whether or not the teaching point $\Gamma$i+1 is accompanied with the indicator L (Step SS5). When YES, the processing proceeds for the processing by sub routine 1 (of Step SS6). If NO, it is examined again whether or not the teaching point $\Gamma$i+1 is accompanied by the indicator A (Step SS7). When YES, the processing advances to sub routine 4 (Step SS8). If NO, it is examined again whether or not the teaching point $\Gamma$i+1 is accompanied with the indicator C (Step SS9). When YES, the processing proceeds to sub routine 2 (Step SS10). If judgment is NO in Step SS9, this indicates that $\Gamma$i+1 is even-numbered C, so that sub routine 3 is executed immediately (Step SS11).

When any of Sub routines 1 to 4 is executed, Ri is calculated too so that remaining Xi, Yi, Zi, Pi and Wi are determined by the equations (1) and (2) (Step SS12) to produce all the teaching data of $\Gamma$i. If $\Gamma$i is accompanied with the indicator C, the operation mode is specified for circular arc segment. Otherwise, the operation mode for a straight line segment is specified. The calculation of circular arc segment is executed using the coordinate data of either $\Gamma$i-1, $\Gamma$i and $\Gamma$i+1 ($\Gamma$i is accompanied with any odd numbered C indicator) or $\Gamma$i-2, $\Gamma$i-1 and $\Gamma$i ($\Gamma$i is accompanied with any even numbered C indicator).

After completing the preparation of the teaching data of $\Gamma$i, the teaching point number index i is increased by 1 (Step SS13). It is then examined whether i=q and i=q+1 (Steps SS14 and SS15 respectively). When $2 \leq i \leq 11$ in Step SS12 in the case of FIG. 8, the processing proceeds to Steps SS14 and SS15 and returns to Step SS4 for repeating the processings of Steps SS4 to SS13 before moving to Step SS14.

When the teaching data of $\Gamma$q-1 (=L12) is obtained in Step SS12, i=13 in Step SS13, and thus judgment for YES is given for the first time in Step SS14. In this case, the data of the final teaching point $\Gamma$q has already been retrieved in Step SS4. Since $\Gamma$q+1 is not given, sub routine 4 is executed (Step SS8). As Rq (R=13) is calculated by sub routine 4, the teaching data of $\Gamma$q is obtained in Step SS12.

When i=q+1 in Step SS13, judgment is NO in Step SS14, and judgment is YES in Step SS15. Then, the processing proceeds to Step SS16 for starting the processing for obtaining the teaching data of the remaining $\Gamma$1. More particularly, the teaching point index is set for i=1 (Step SS16), and the data of $\Gamma$1 is retrieved (Step SS2). When YES is given in Step SS3, the sub routine 5 is executed (Step SS17), and the teaching data of $\Gamma$1 (=A1) is made available (Step SS18). Finally, the mode flag MF is reset to 0 (Step SS19), and the calculation and production of the teaching data along an operation line (a machining route for deburring) is completed.

For the resetting of mode flag, the mode flag remain unchanged as MF=0 when the operation has been executed in the right-position mode like the case of FIG. 8 and has to be changed from 1 to 0 when the operation has been executed in the left-position mode.

Figure 11:
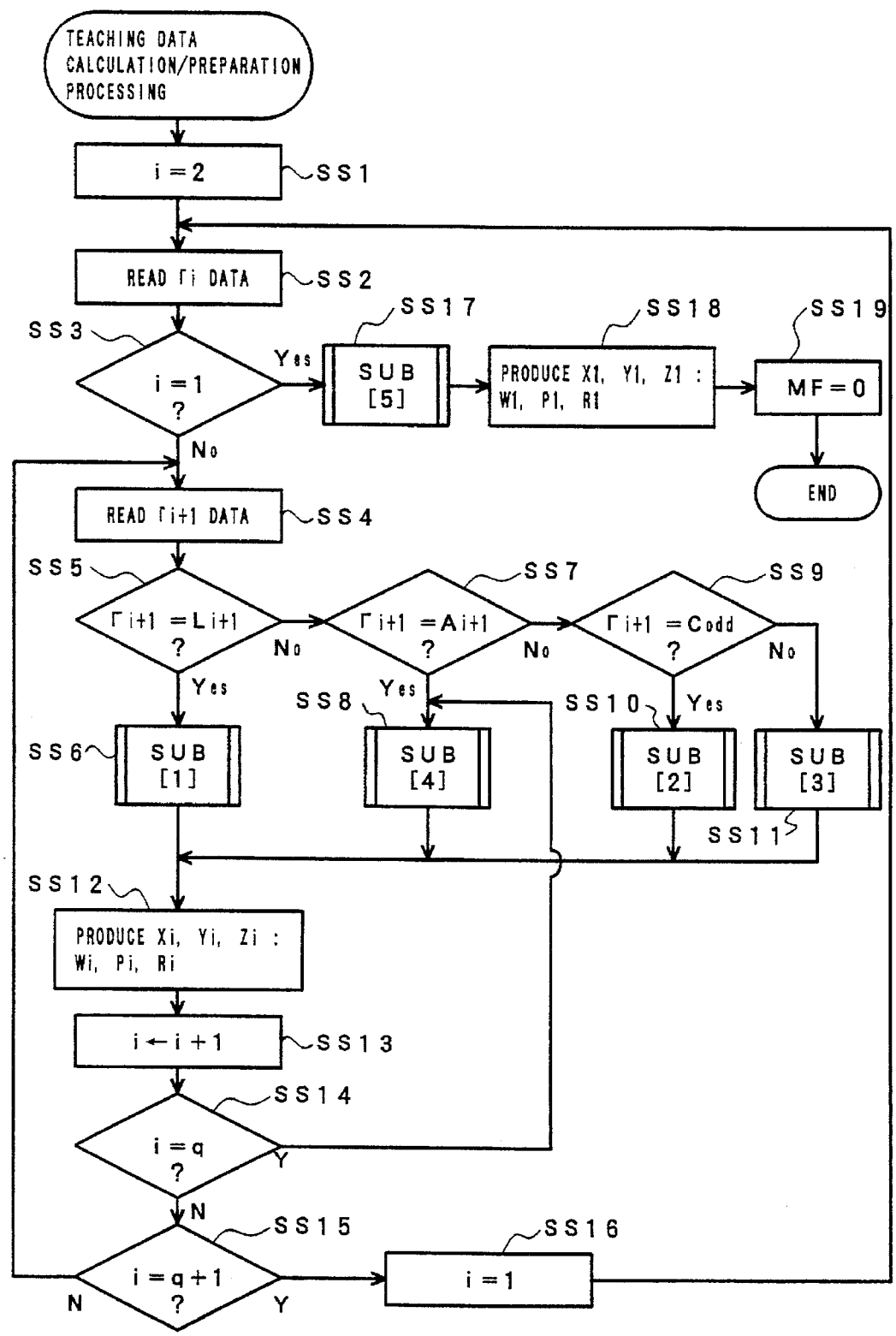
FIG. 11 is a flow chart showing the outline of the content of processing by the program for determining the posture of the robot based on the data processed for the insertion of the circular arc as shown in FIGS. 8a and 8b respectively.

As seen from the forgoing description, according to the flaw chart shown in FIG. 11, the processing for obtaining the teaching data of each of the teaching points $\Gamma$i to $\Gamma$q always includes one sub routine. The rule for selecting from among Sub routines 1 to 5 corresponds to the previously described condition selection rule.

Figure 12:
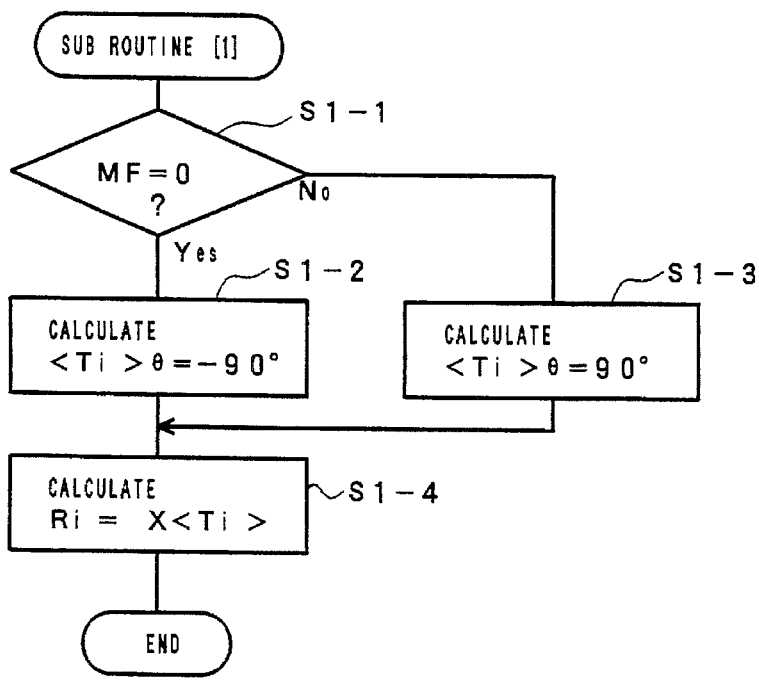
FIGS. 12 to 16 are flow charts respectively showing the outlines of the processings according to the sub routines 1 to 5 to be included in the processing described in FIG. 11.
Figure 14:
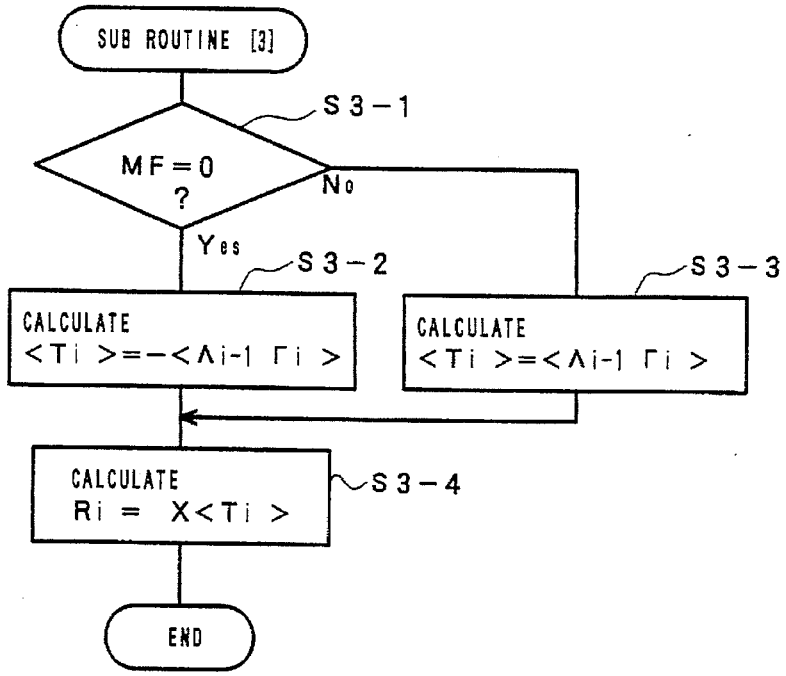
Figure 13:
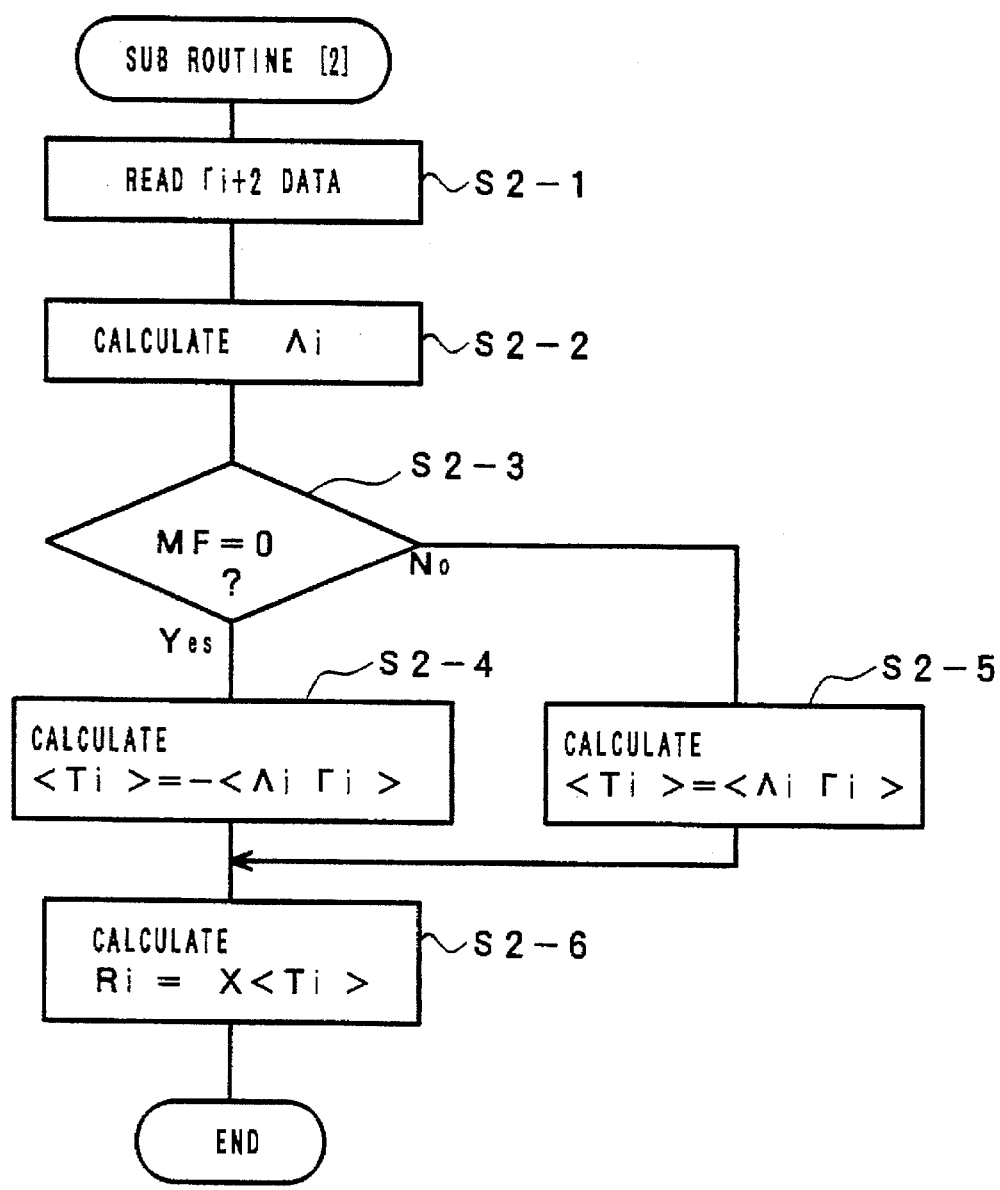
Figure 15:
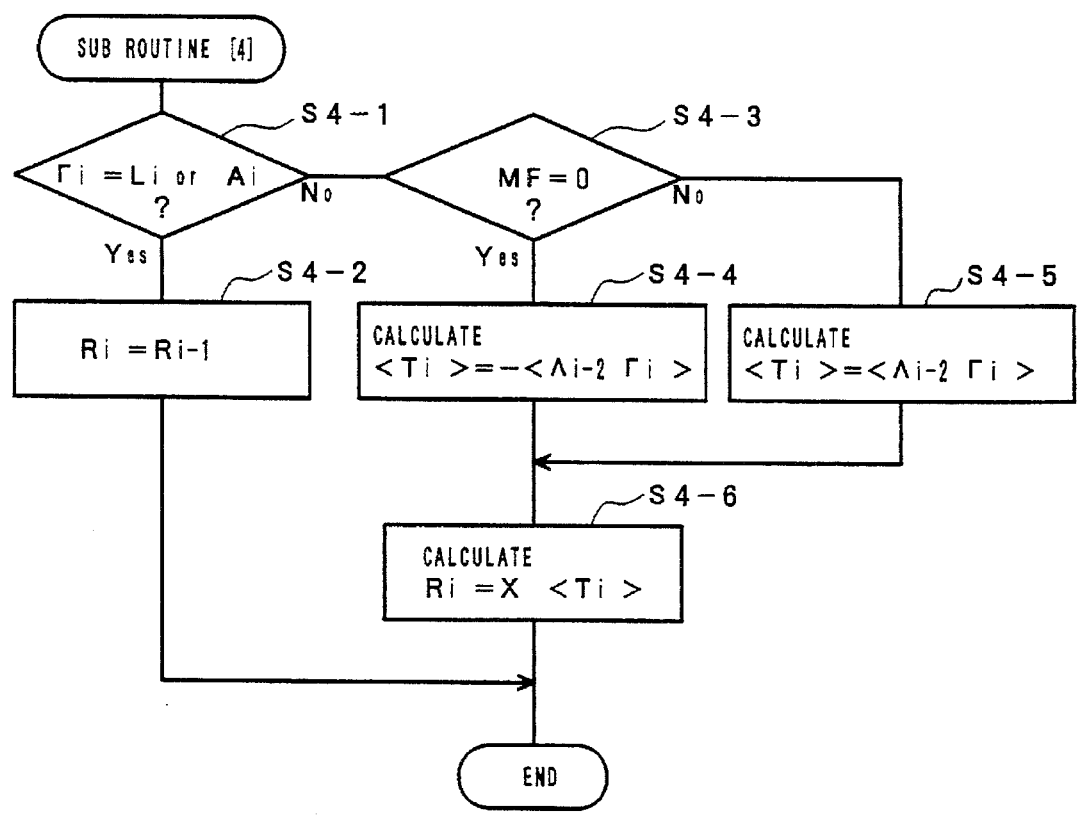
Figure 16:
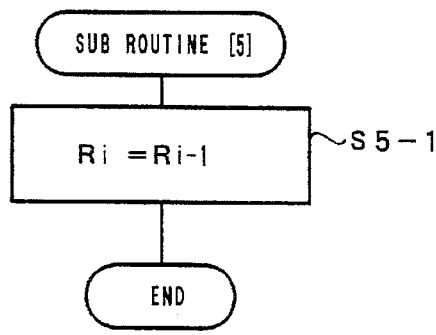

The contents of Sub routines 1 to 5 have been explained previously; however, they are also illustrated in the form of flaw charts in FIGS. 12 to 14.

In sub routine 1 whether the mode flag MF is 0 or not is examined (Step S1-1). When YES (in the right-position mode), the equation (4) is calculated as $\theta=-90°$ to determine a vector <Ti> perpendicular to vector <$\Gamma$i$\Gamma$i+1> (Step S1-2). Then, an angle between the vector <Ti> and the X axis (a unit vector Ex on the X axis) is determined as Ri (Step S1-4), thereby terminating the sub routine.

When the mode flag MF is not 0 (in the left-position mode), the processing proceeds moves from Step S1-1 to Step S1-3 where the equation (4) is calculated as $\theta=90°$ to determine a vector <Ti> perpendicular to vector <$\Gamma$i$\Gamma$i+1>. Then, an angle between the vector <Ti> and the X axis (a unit vector Ex on the X axis) is determined as Ri in Step S1-4, thereby terminating the sub routine.

The processing by sub routine 1 is executed for L2, C5, C8 and C11 in the case shown in FIG. 8 as described previously.

In the processing by sub routine 2, the coordinate data of $\Gamma$i+2 is retrieved first (Step S2-1), and the center Ai of circular arc segment defined by the three points $\Gamma$i, $\Gamma$i+1 and $\Gamma$i+2 is determined (Step S2-2). It is then examined whether the mode flag is MF=0 or not (Step S2-3), and vector <Ti> is obtained in the manner similar to that of sub routine 1. When MF=0, the equation (5) is used for calculation (Step S2-4). When MF=1, the equation (6) is used for calculation (Step S2-5). Then, an angle between the obtained vector <Ti> and the X axis is determined as Ri by calculation (Step S2-6), thereby terminating the sub routine. In the case shown in FIG. 8, as described previously, the processing by sub routine 2 is executed for L3, L6 and L9.

In the processing by sub routine 3, whether MF=0 or not is examined (Step S3-1). Then, vector <Ti>=-<Ai-1$\Gamma$i> (Step S3-2) or <Ti>=<Ai-1$\Gamma$i>(Step S3-3) is determined using the data of the center Ai-1 of circular arc segment defined by $\Gamma$i-1, $\Gamma$i and $\Gamma$i+1. As is obvious from the conditions for selection in sub routines 2 and 3, and the flow chart of FIG. 11, the center Ai-1 of circular arc segment corresponding to the immediately preceding teaching point has been calculated by the sub routine 2, so that this data, as it is, can be used as the coordinate values of Ai-1.

Also, an angle between the vector <Ti> and the X axis is calculated as Ri (Step S3-4), and the processing by sub routine 3 is ended.

In the case shown in FIG. 3, as described previously, the processing by sub routine 3 is executed for C4, C7 and C10.

In the processing by sub routine 4, whether the indicator attached to $\Gamma$i is L or A is examined (Step S4-1). When YES, Ri=Ri-1 is given (Step S4-2) and the processing is ended. When NO, it is examined whether MF=0 or 1 (S4-3). Then, vector <Ti>=-<Ai-2$\Gamma$i>(Step S4-4) or vector <Ti>=<Ai-2i>(Step S4-5) is determined in the same manner as that of sub routine 3.

In this sub routine too, the data of Ai-2 corresponding to the first and second preceding teaching points can be used, as they are, as obvious from the conditions for selection of sub routines 2 and 3 and the flow chart of FIG. 9.

Also, an angle between the vector <Ti> and the X axis is calculated as Ri (Step S4-6), and the processing by sub routine 4 is ended.

In the case of FIG. 8, as previously described, the processing by sub routine 4 is executed for L12 and A13.

In the sub routine 5, only the processing for giving Ri=Ri−1 is executed for repeating the robot posture determined for the preceding teaching point. In the case shown in FIG. 3, the processing by sub routine 4 is executed for Γi=A1.

As seen from the flow of processing shown in FIG. 11, when any of these sub routine programs is executed, the position data of i-th teaching point is produced together with the position data of Xi, Yi, Zi, Pi and Wi.

According to the present invention, when an original data such as a CAD data concerning the operation line of a workpiece as an object of deburring operation, which can be processed by an information processing means and is adapted for off-line teaching, is available, the original data concerning bent segment of the operation line (junction of two linear segments or cornered segment) can automatically be processed for replacement with a circular arc segment, so that, even when the operation line includes a bent segment, the off-line teaching can be executed efficiently and without fear of erroneous teaching.

According to prior arts, for example, when manually entering the data of a circular arc segment in a CAD system to replace a bent segment for teaching a desired position and posture to a robot along a bent segment of an operation line, this involves a costly labor such as drawing on a screen of the CAD system a number of lines with respect to many bent segments which are not directly related with the actual operation line. Such an unnecessary work is eliminated by the present invention.

Also, according to the present invention, the processing for inserting a circular arc segment can be executed based on a compatible rule and using the coordinate data and path environment identifying information included in the original data, so that it is not necessary to provide individual programs for executing the off-line data teaching for individual tasks. As long as the operation line of the robot consists of linear segments and circular arc segments, the off-line data teaching can readily be applied to almost all the cases of the work using a robot.

We claim:

1. An off-line teaching method for a robot for teaching the robot a position and a posture through software processing using an information processing means, comprising the steps of:

(a) preparing, in a form capable of being processed by said information processing means, the coordinate data representing the original teaching points for defining an operation line along which said robot is to be moved, said original teaching points including at least one bent junction at which two linear segments intersects with each other;

(b) defining a first point on one of said two linear segments, a second point on the other linear segment and a third point in the vicinity of said bent junction in order to define a circular arc of a small radius, which continuously joins the two linear segments intersecting at said bent junction, using the data relating to said bent junction in said coordinate data representing said original teaching points, said third point being situated on said small-radius circular arc which tangentially joins said two linear segments at said first and second points; and (c) teaching said robot a position and a posture at said first, second and third points in place of said bent junction.

2. An off-line teaching method for a robot according to claim 1, wherein said step (a) further comprises a step of adding a data for specifying the sequence of the movement of said robot and a data for specifying a type of path form at each of said original teaching points.

3. An off-line teaching method for a robot according to claim 2, wherein said step (b) includes a step of defining said first, second and third points using said data for specifying sequence of the movement of said robot and said data for specifying the type of path form at each of said original teaching points in addition to the data relating to said bent junction.

4. An off-line teaching method for a robot according to claim 1, wherein said step (b) further comprises a step of adding a data for specifying the sequence of the movement of said robot and a data for specifying a type of path form at said first, second and third points and each of said teaching points other than said bent junction.

5. An off-line teaching method for a robot according to claim 4, wherein said step (c) includes a step of teaching said robot position and posture, using the coordinate data of said first, second and third points, said data specifying the sequence of the movement of the robot, and said data specifying the type path form.

6. An off-line teaching method for a robot according to claim 1, wherein said step (a) further includes a step for preparing coordinate data specifying air-cut points linked to the start and terminal points of the operation line in addition to said coordinate data of the original teaching points.

7. An off-line teaching method for a robot according to claim 6, wherein the step (a) further comprises a step of adding a data specifying the sequence of the movement of said robot and a data for specifying the type of path form associated with the coordinate data of each of said original teaching points and air-cut points.

8. An off-line teaching method for a robot according to claim 1, wherein said operation line for said robot comprises a machining path along which the robot performs deburring operation.

\* \* \* \* \*